US008644975B2

(12) United States Patent
Paul et al.

(10) Patent No.: US 8,644,975 B2
(45) Date of Patent: Feb. 4, 2014

(54) DISPLAY CARD FOR CUSTOM-MANUFACTURED ITEM AND METHOD

(75) Inventors: Tiffany L. Paul, Portland, OR (US); Kirk S. Jones, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 540 days.

(21) Appl. No.: 12/246,213

(22) Filed: Oct. 6, 2008

(65) Prior Publication Data

US 2009/0254207 A1 Oct. 8, 2009

Related U.S. Application Data

(60) Provisional application No. 60/977,393, filed on Oct. 4, 2007.

(51) Int. Cl.
G06F 17/50 (2006.01)
G06K 19/06 (2006.01)

(52) U.S. Cl.
USPC ............................................ 700/117; 700/97

(58) Field of Classification Search
USPC ........ 700/95, 97, 98, 117, 182; 705/16, 25, 1, 705/300; 703/1; 235/492
See application file for complete search history.

(56) References Cited

U.S. PATENT DOCUMENTS

| 4,929,821 A | 5/1990 | Kocznar et al. |
| 5,324,922 A * | 6/1994 | Roberts .......................... 235/375 |
| 6,299,962 B1 * | 10/2001 | Davis et al. ...................... 428/98 |
| 6,533,885 B2 * | 3/2003 | Davis et al. .................... 156/219 |
| 6,725,124 B2 * | 4/2004 | Yan ................................ 700/132 |
| 6,739,368 B2 * | 5/2004 | Shirakura et al. .............. 156/510 |
| 6,772,026 B2 * | 8/2004 | Bradbury et al. ................ 700/98 |
| 7,016,882 B2 * | 3/2006 | Afeyan et al. .................... 706/13 |
| 7,104,539 B2 * | 9/2006 | Shimoyama ................... 271/167 |
| 7,149,665 B2 * | 12/2006 | Feld et al. .......................... 703/2 |
| 7,216,092 B1 * | 5/2007 | Weber et al. .................. 705/26.5 |
| 7,275,045 B2 * | 9/2007 | Muneishi et al. ............. 705/26.4 |
| 7,280,949 B2 * | 10/2007 | Kano et al. ......................... 703/7 |
| 7,325,730 B2 * | 2/2008 | Kimura et al. ................. 235/383 |
| 7,461,012 B2 * | 12/2008 | Elberbaum .................. 705/27.1 |
| 7,945,343 B2 * | 5/2011 | Jones et al. ...................... 700/97 |
| 2002/0120531 A1 * | 8/2002 | Fonsen ............................ 705/26 |
| 2003/0033207 A1 | 2/2003 | Litke et al. |

(Continued)

FOREIGN PATENT DOCUMENTS

| DE | 3719522 A | * 12/1987 |
| JP | S63-502705 | 10/1988 |
| JP | 2003-108878 | 4/2003 |

OTHER PUBLICATIONS

International Search Report and Written Opinion from related PCT Application No. PCT/US2008/78953 mailed Mar. 23, 2009.

(Continued)

*Primary Examiner* — Charles Kasenge
(74) *Attorney, Agent, or Firm* — Banner & Witcoff Ltd.

(57) ABSTRACT

A system and method allows a consumer to custom-order an item, such as footwear. The system is capable of accepting a designation for the design of the item by a consumer wherein the item is custom-manufactured according to designation of a characteristic made by the consumer. A display card is associated with the system and has a card member having indicia thereon. The indicia correspond to the designation of the characteristic provided by the consumer.

32 Claims, 41 Drawing Sheets

(56) References Cited

U.S. PATENT DOCUMENTS

| | | | |
|---|---|---|---|
| 2005/0001027 A1* | 1/2005 | Bahar | 235/382 |
| 2005/0071242 A1 | 3/2005 | Allen et al. | |
| 2005/0223600 A1* | 10/2005 | Hunter et al. | 36/112 |
| 2006/0020482 A1* | 1/2006 | Coulter | 705/1 |
| 2006/0032904 A1* | 2/2006 | Kawamoto et al. | 235/380 |
| 2006/0151600 A1* | 7/2006 | Kimura et al. | 235/383 |
| 2006/0255939 A1* | 11/2006 | Spector | 340/568.1 |
| 2007/0043582 A1 | 2/2007 | Peveto et al. | |
| 2007/0095615 A1* | 5/2007 | Spector | 186/52 |
| 2007/0120875 A1* | 5/2007 | Aygar et al. | 345/689 |
| 2007/0164554 A1* | 7/2007 | Krone et al. | 283/56 |
| 2007/0261997 A1* | 11/2007 | Cassady et al. | 209/3.3 |

OTHER PUBLICATIONS

Japanese Patent Application No. 2010-528209 Notice of Reasons for Rejection dated Jul. 30, 2012 including translation.

* cited by examiner

DISPLAY CARD FOR CUSTOM-MANUFACTURED ITEM AND METHOD

CROSS-REFERENCE TO RELATED APPLICATIONS

This application claims priority to and the benefit of U.S. Provisional Patent Application 60/977,393 filed on Oct. 4, 2007, and is entirely incorporated herein by reference.

FEDERALLY SPONSORED RESEARCH OR DEVELOPMENT

Not applicable.

TECHNICAL FIELD

The invention generally relates to an apparatus and method relating to the custom-manufacture of items such as footwear or athletic equipment and, in particular, to a display card having indicia thereon corresponding to a custom-manufactured item.

BACKGROUND OF THE INVENTION

Before the Industrial Revolution, most manufactured items were custom-manufactured to a customer's particular specifications. While customers could thus obtain items manufactured to their personal preferences, these custom-manufactured items were prohibitively expensive. Thus, a typical person might only own a few pairs of shoes.

After the Industrial Revolution, most manufactured items could be mass-produced, reducing the cost of these items. This allowed many manufactured items, e.g. automobiles, to be purchased by customers that might not otherwise have been able to purchase these items were they custom-manufactured. Still, some items, such as automobiles, clothing, and shoes continue to be custom-manufactured according to customers' specifications, as there are many customers who would prefer to accept the added expense of custom-manufacturing in order to obtain a product that meets their particular preferences. Regrettably, only a small portion of the population can afford this indulgence for many items.

Over time, systems have been developed that allow consumers to order custom-manufactured items more efficiently and at a reasonable cost. Certain systems utilize computer technology wherein consumers custom-design items for manufacture using a computer program. Computer programs can also be configured as part of a web-based system using the Internet.

While custom-manufacturing systems according to the prior art provide a number of advantageous features, they nevertheless have certain limitations. For example, the systems lack the ability for consumers to track completed designs for later reference. The present invention seeks to overcome certain of these limitations and other drawbacks of the prior art, and to provide new features not heretofore available.

SUMMARY OF THE INVENTION

The present invention provides a custom manufacturing system that provides a display card relating to the custom-manufactured item designed by a consumer.

According to a first aspect of the invention, the system provides a method allowing a consumer to custom order an item, such as footwear, or other athletic equipment. The system is capable of accepting a designation for the design of the item by a consumer wherein the item is custom-manufactured according to designation of a characteristic made by the consumer. A display card is associated with the system and has a card member having indicia thereon. The indicia correspond to the designation of the characteristic provided by the consumer.

Other features and advantages of the invention will become apparent from the following description taken in conjunction with the following drawings.

DETAILED DESCRIPTION

Figure 1:
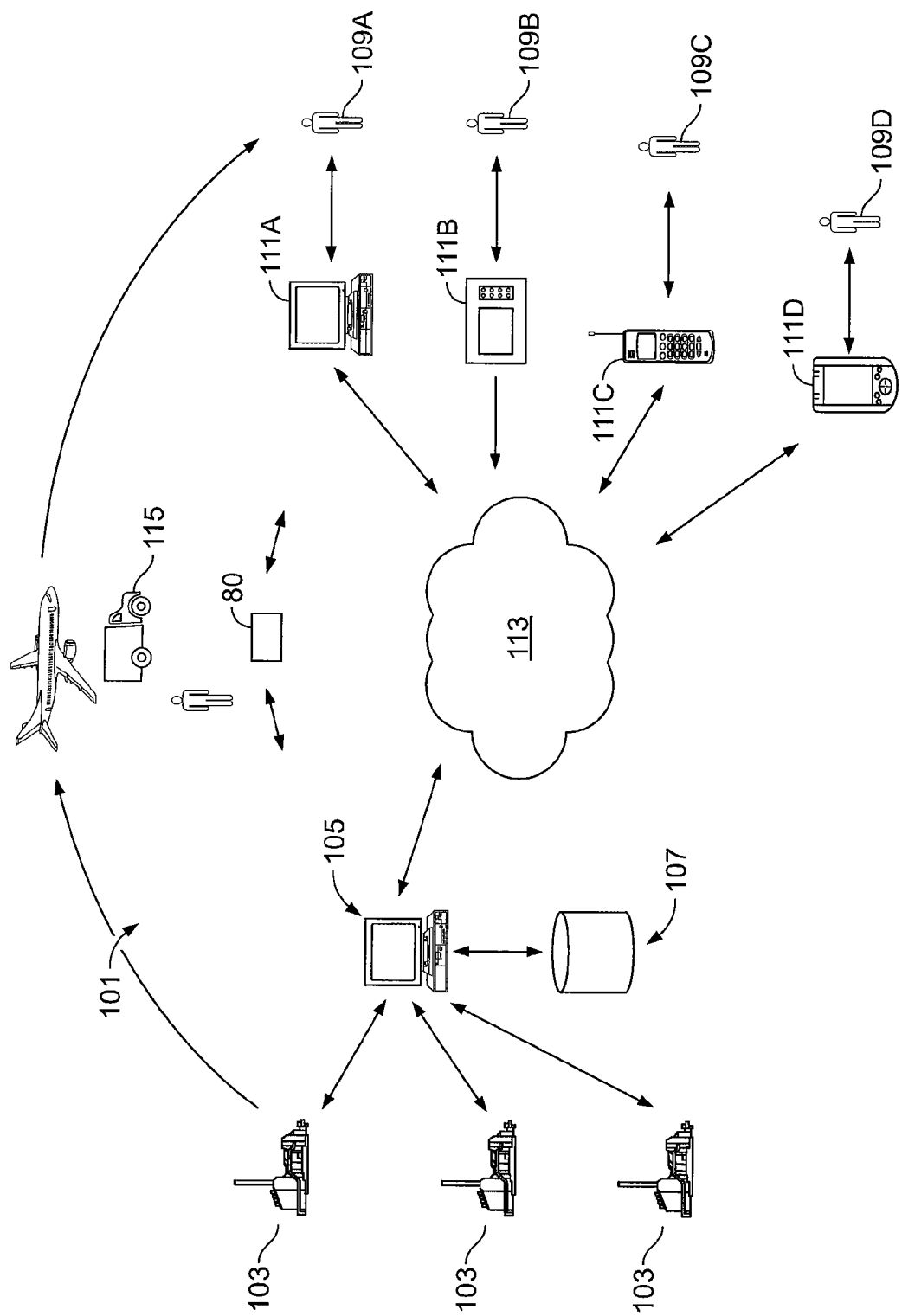
FIG. 1 is a schematic view of a system used for custom-manufacture of an item.

While the invention is susceptible of embodiment in many different forms, there is shown in the drawings and will herein be described in detail preferred embodiments of the invention. It is to be understood that the present disclosure is to be considered as an exemplification of the principles of the invention. This disclosure is not intended to limit the broad aspect of the invention to the illustrated embodiments.

Overview

FIG. 1 illustrates components of a system 101 according to one embodiment of the invention. The system 101 includes one or more manufacturing facilities 103 (e.g., factories) and a computer server 105 in communication with each of the manufacturing facilities 103. The computer server 105 preferably communicates with the manufacturing facilities 103 by a communications network, such as the Internet, but the computer server 105 may alternately communicate with the manufacturing facilities 103 via any suitable means, such as by telephone, telegraph, parcel mail, etc. The system 101 also includes a database 107 connected to the server 105. As will be explained in detail below, the database 107 may maintain information provided to the server 105 by both the manufacturing facilities 103 and the customers 109.

As shown in FIG. 1, a plurality of customers 109 communicates with the server 105 through various computer network communication devices 111. These communication devices 111 may include, for example, Internet-capable personal computers, Internet-capable television devices, Internet-capable personal digital assistants, Internet-capable wireless devices such as telephones, etc. Each of the devices 111 is connected to the server 105 through a computer communications network, such as the Internet 113. In addition, each of the manufacturing facilities 103 may be able to ship manufactured items to the customers 109 through one or more parcel delivery networks 115, such as the U.S. Postal Service or other private parcel service provider.

As will be explained in detail below, the server 105 communicates with each customer's computer device 111 via the Internet 113 in order to provide each customer 109 with a set of options for custom-manufacturing an item, such as footwear or a piece of athletic equipment. For example, in response to a request from the customer 109A, the server 105 may transmit an HTML page (commonly referred to as a Web page) with a set of color choices for the item to the customer's computer device 111A. The customer 109A can then use his or her computer device 111A to designate which of the available colors he or she would prefer for his or her custom-manufactured item, and transmit this information to the server 105.

The server 105 and the customer 109A can then continue to exchange information regarding the characteristics (e.g., color, size, shape, structural components, etc.) of the item to be custom-manufactured, until the customer 109A has conveyed all desired characteristics for the manufactured item to the server 105. The server 105 can then pass the order for the custom-manufactured item, along with these designated characteristics, to one of the manufacturing facilities 103. Upon receiving the order for the custom-manufactured item and the selected characteristics for the custom-manufactured item, the manufacturing facility 103 can manufacture the item to have the selected characteristics, and then forward the custom-manufactured item to the customer 109A by the parcel service 115. FIG. 1 furthers shows a printer 80 that can be in communication with server 105 or consumer computing devices 111. The printer 80 provides enhanced features for the system 101 by providing a display card as described in greater below.

Figure 2A:
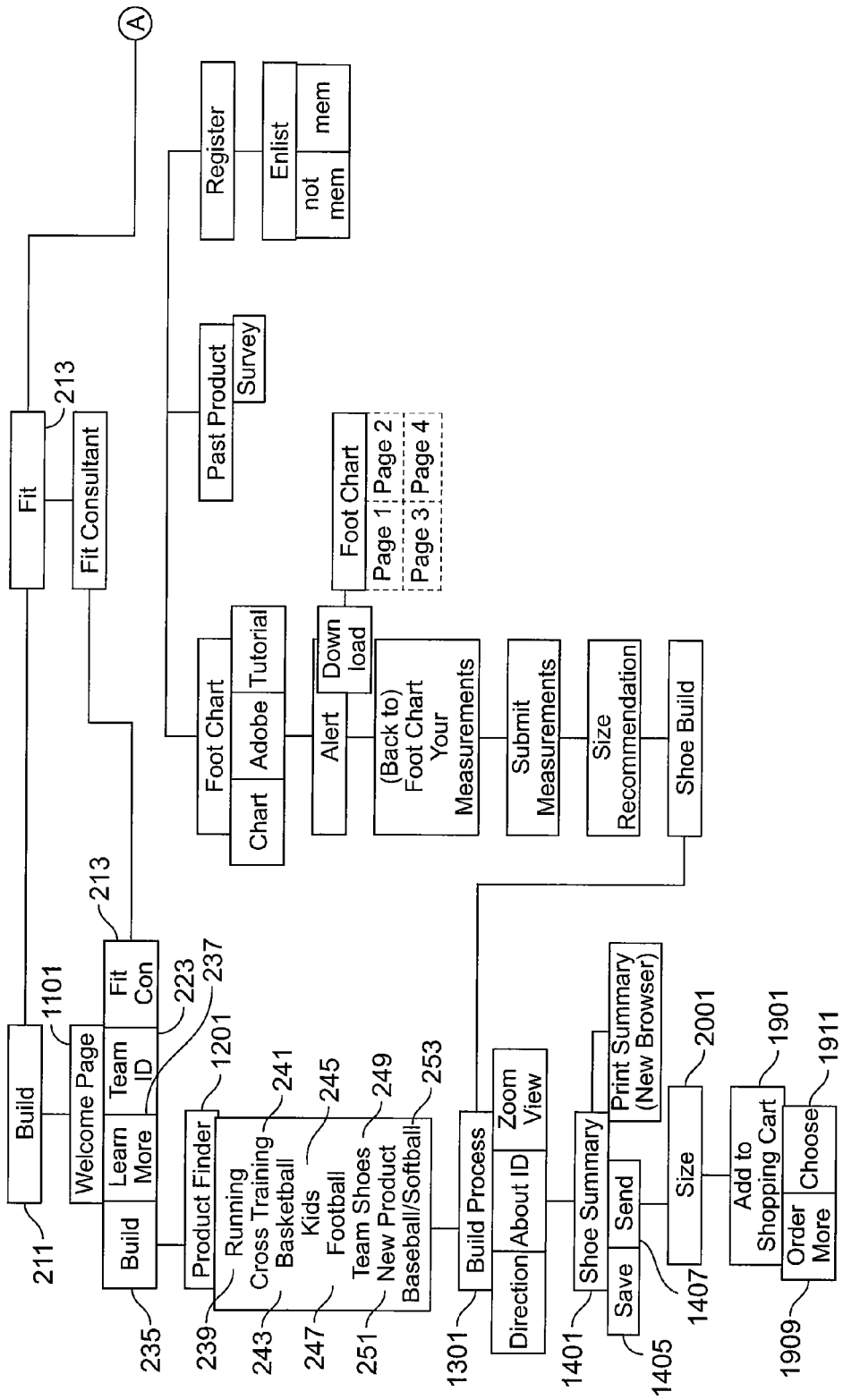
FIGS. 2A-20B are various views showing a custom-ordering system for custom-manufactured items including a website and web pages associated therewith.
Figure 2B:
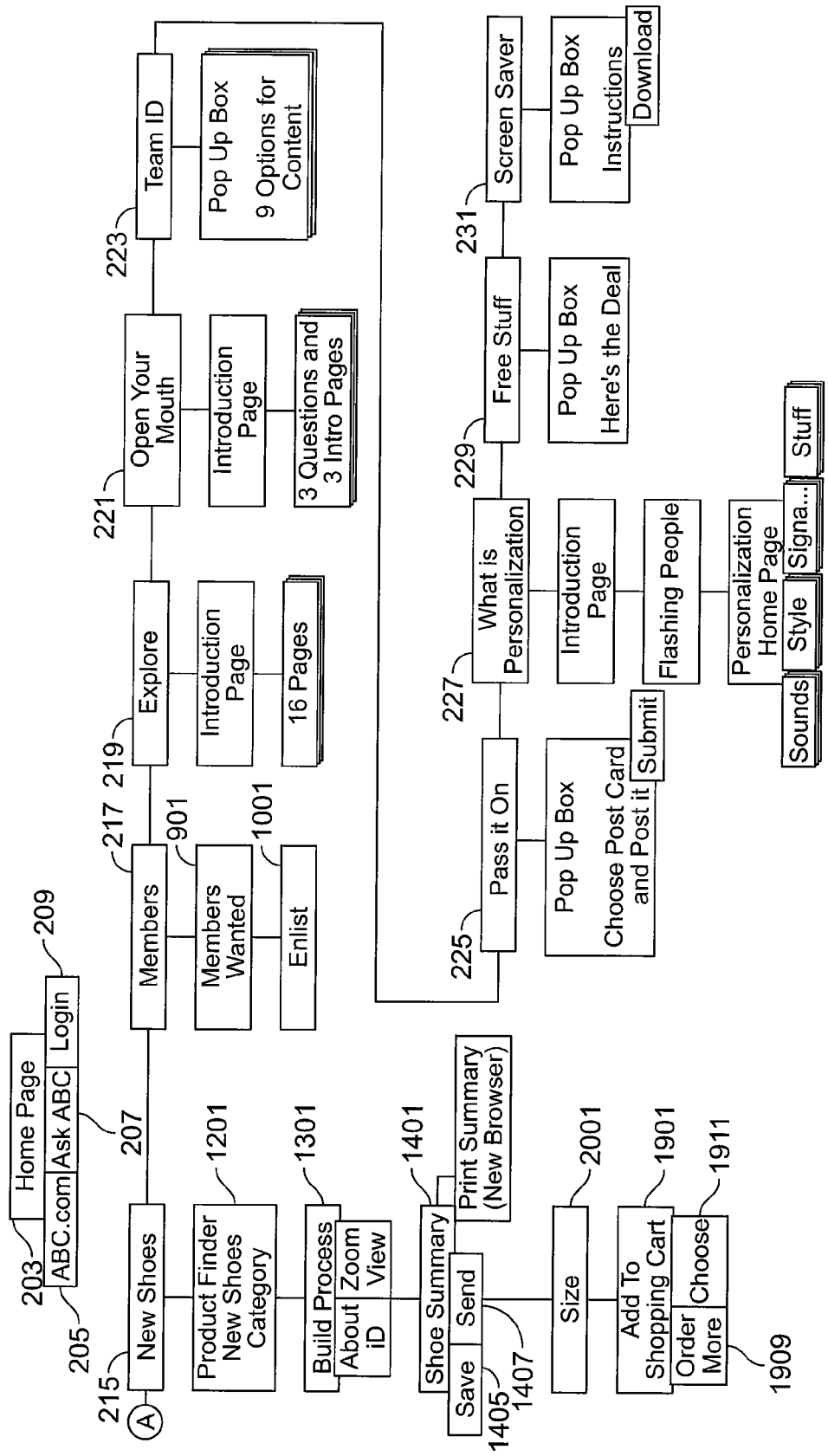

The operation of the server 105 according to one embodiment of the invention will now be described with respect to FIGS. 2A-20B. FIGS. 2A-2C illustrate a schematic diagram of one embodiment of a Web site 201 provided by the server 105. As is known in the art, a Web site conventionally refers to a collection of Web pages (i.e., pages written in Hypertext Markup Language (HTML)) that are linked, so that each of the Web pages in the Web collection can be accessed through at least one other Web page in the collection. Each of the blocks illustrated in FIGS. 2A-2C may represent any of a single Web page, a combination of Web pages, a button or link accessible in one Web page for retrieving another Web page, or a block of content to be included in a Web page.

As is known in the art, a computer connected to a network can access Web pages maintained in that network by using a browser software program, such as Microsoft's Internet Explorer or Netscape Navigator. Conventionally, a user activates a link to a particular Web page by, for example, moving a cursor displayed by the computer over the browser's display of that link, and then triggering an activation button (e.g., a button on a pointing device controlling the cursor).

Figure 3:
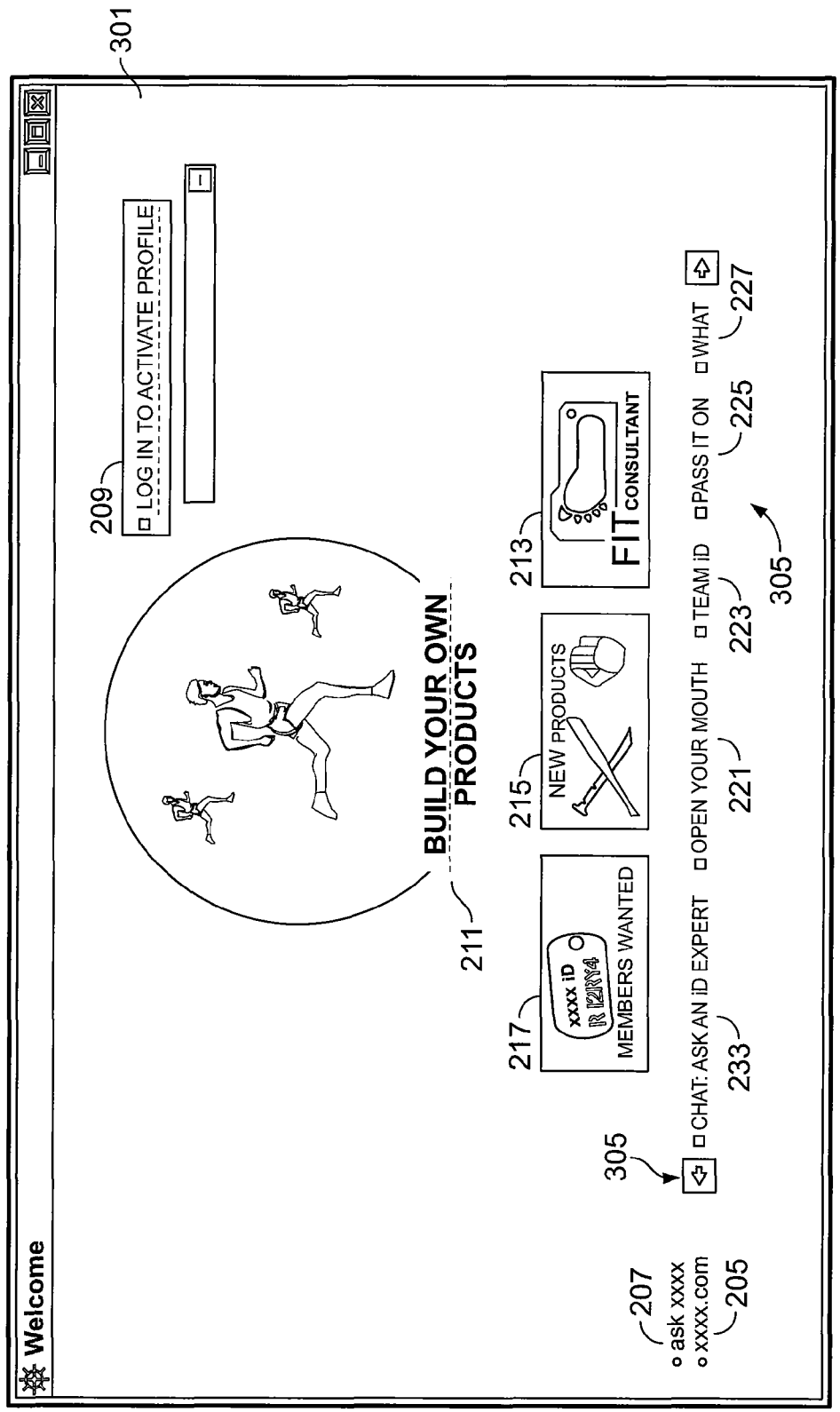
Figure 4:
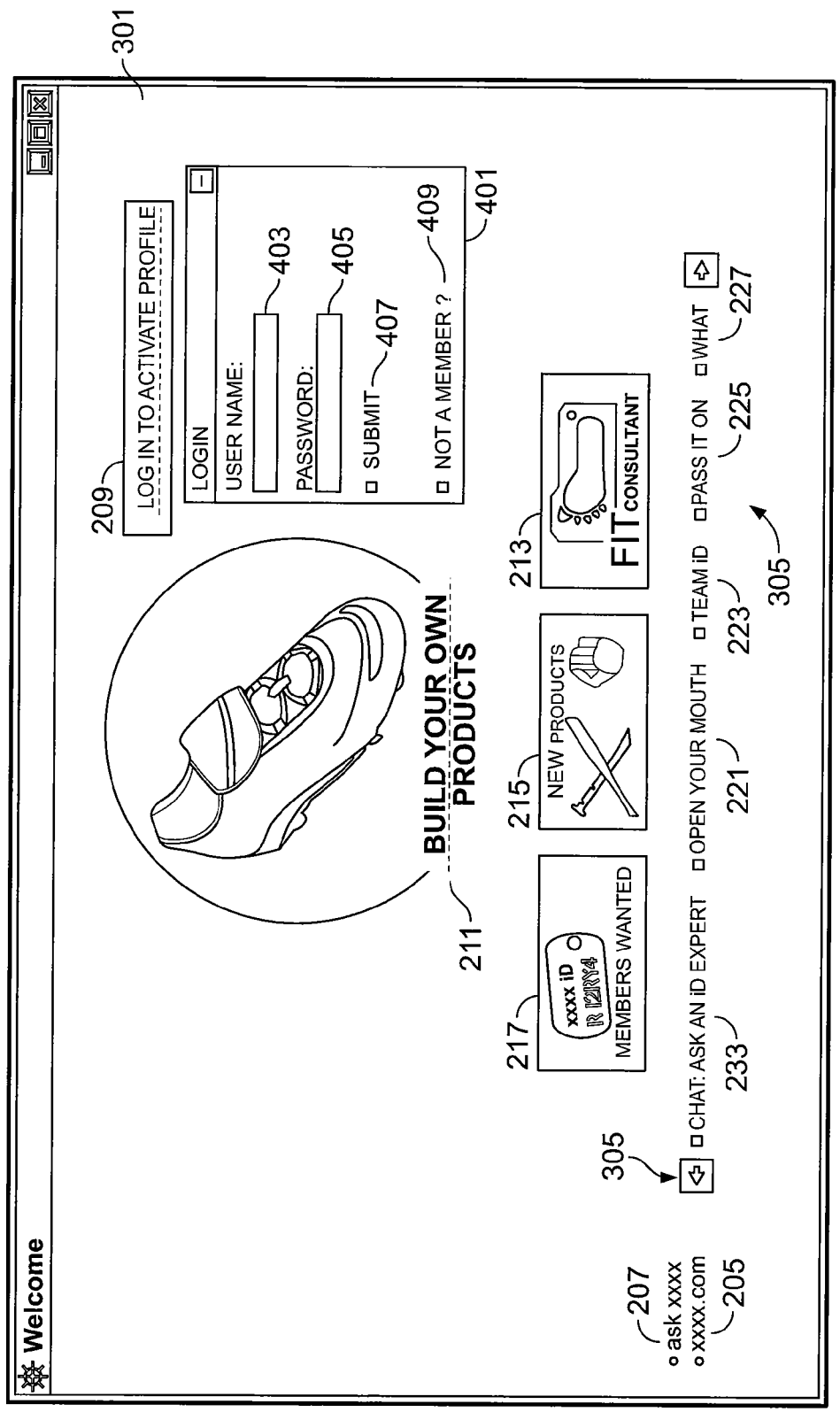
Figure 5:
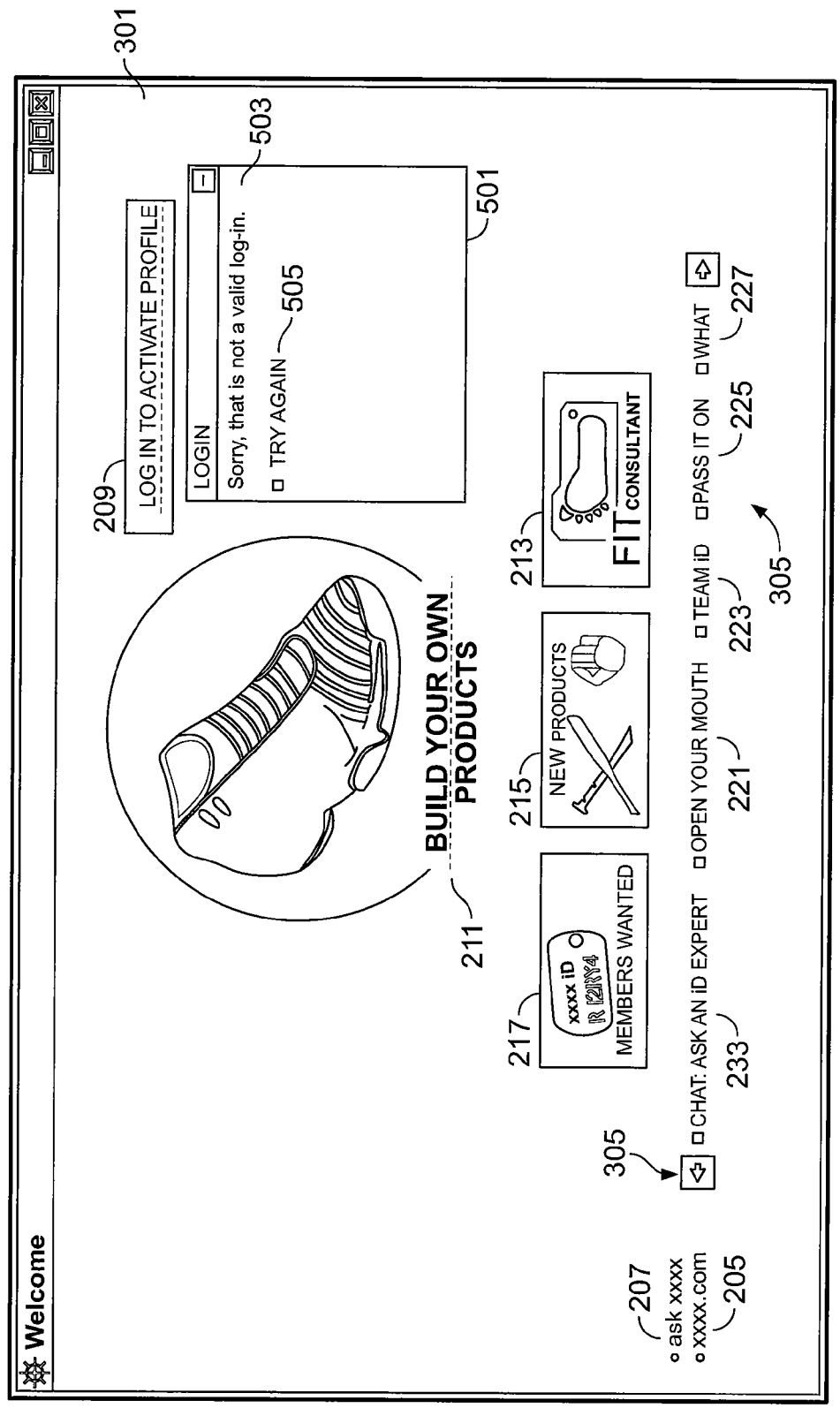

Referring back to FIGS. 2A-2C, the Web site 201 includes a home page 203 (shown in FIG. 3). The home page 201 includes command buttons or links 205, 207 and 209 that can be activated to retrieve different Web pages. For example, the link 205, when activated, retrieves a home page for the site entitled "ABC.com." The command button or link 207 retrieves a Web page corresponding to the title "Ask ABC," while the command button or link 209 retrieves a Web page corresponding to the title "Login." (The operation of the Web pages corresponding to the title "Login" will be explained in detail below.) Each of these links is shown in FIG. 3.

The home page 203 also includes links 211-233, corresponding to the titles "Build," "Fit," "New Shoes," "Members," "Explore," "Open Your Mouth," "Team iD," "Pass It On," "What Is Personalization," "Free Stuff," "Screen Saver," and "Chat," respectively. As can be seen in FIG. 3, command buttons or links 211-217 are provided on the image of the page 203 itself, while the links 219-233 are provided on a menu bar 303 included in the image of the Web page 201. As shown in FIG. 3, only links 221-227 and 233 are apparent on the menu bar 303. A customer 109 can reveal any of the remaining links provided on the menu bar 303, however, by activating one of the two navigation buttons 305, as is known in the art. Some of the links 211-233 (and their associated Web pages) relate to various embodiments of the invention, while others do not. Thus, each of these Web pages will be discussed below only if and only as they relate to particular embodiments of the invention.

Using a Customer Account

The first feature of the Web site 201 that will now be discussed is the function associated with the button or link 209 corresponding to the title "Login," as this function interacts with the operation of other portions of the Web site 201. The "Login" feature allows the server 105 to associate a particular session at the Web site 201 with a particular customer 109. That is, a customer 109 can employ the Login function to identify himself or herself to the server 105 for the duration of a session using the Web site 201. Because the server 105 can then associate information obtained from that particular customer 109 during the session, the server 105 can store the information in the database 107 so that it can later be associated with the customer 109 during subsequent sessions at the Web site 201.

To use the Login feature, a customer 109 first activates the Login command button 209. This retrieves Web page 401, illustrated in FIG. 4 (but not shown in FIG. 2). The Web page 401 includes two fields 403 and 405. The web page 401 also includes two command buttons 407 and 409, for submitting a name and password associated with an existing account with the server 105, and for requesting a Web page to submit information to create a new account, respectively.

If the customer 109 has already established a user account with the server 105, the customer 109 can enter his or her user name for that account in field 403 and his or her associated password for the account in field name 405. The customer 109 can then activate the "submit" button 407 to submit the user name and password entered in the fields 403 and 405 to the server 103 for validation. If the information provided in fields 403 and 405 does not correspond with an existing account with the server 105, then the server provides a new page 501 shown in FIG. 5. As seen in this figure, the Web page 501 includes a message 503 indicating that the information provided in the fields 403 and 405 did not correspond with an existing account maintained by the server 105, and a link 505 to retrieve the web page 401 so that the customer can submit new information regarding an existing account.

If the information entered in fields 503 and 505 corresponds with an account already established with the server 105, the server 105 will then associate all future information submitted by the customer 109 during that session with that customer 109. Moreover, the server 105 will provide the customer 109 with access to the information associated with the customer 109 that has previously been stored in database 107 for the customer's user account. More particularly, the server 103 provides the customer 109 with the Web page 601, shown in FIG. 6. The page 601 includes links 603 and 605, corresponding to the titles "Saved Builds" and "My Measurements," respectively.

Figure 7:
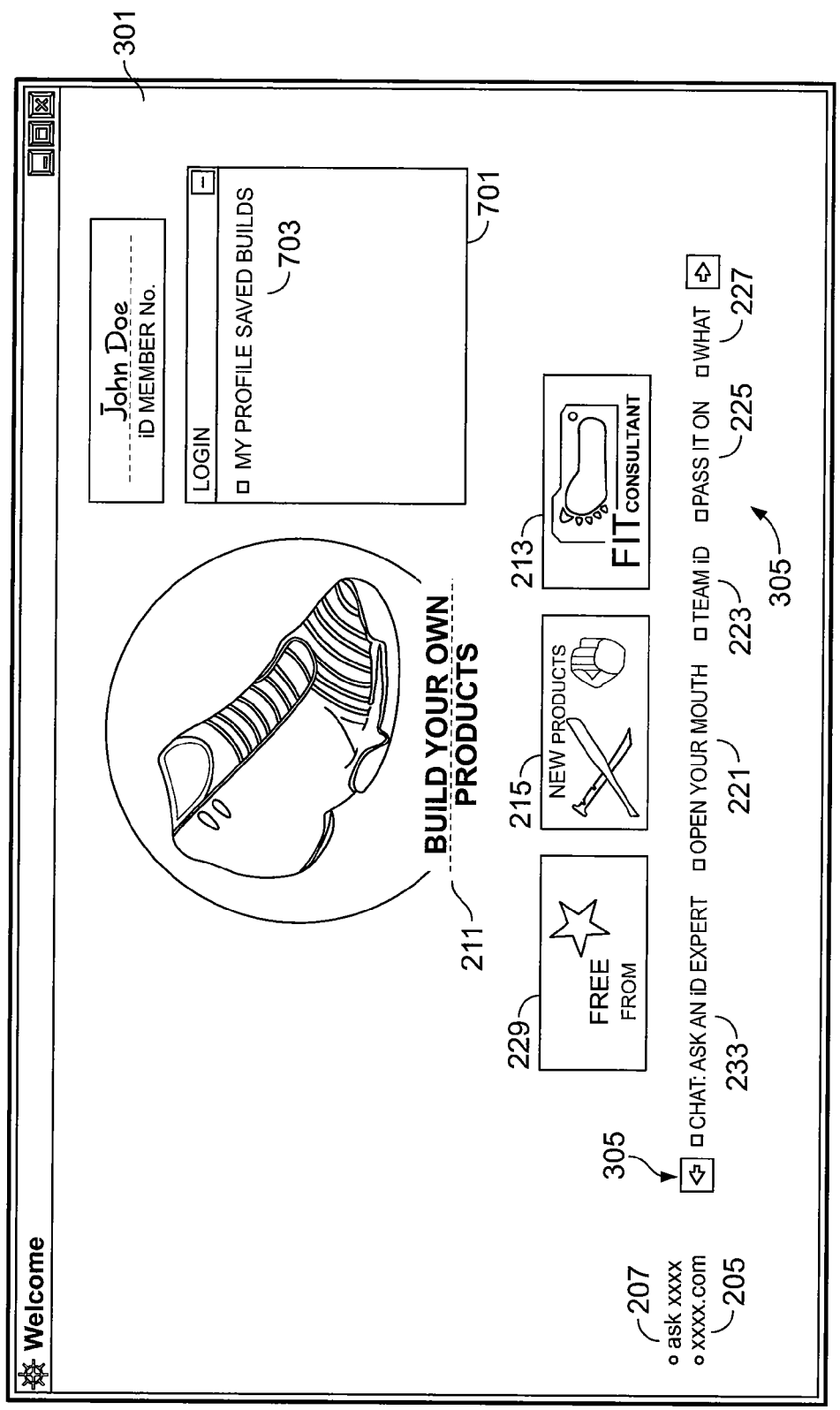

Activating the link 603 retrieves the Web page 701, shown in FIG. 7. This page 701 includes a listing of any custom-manufacturing specifications the customer 109 has previously designated, as will be discussed in detail below. (No specifications or "builds" are shown in FIG. 7.) The Web page 701 also includes a link 703 to return to the Web page 601. Activating the link 605 retrieves the Web page 801, shown in FIG. 8. This Web page 801 includes a listing 803 of relevant measurements (e.g., footwear size) already provided by the customer 109, and a command button 805 that the customer 109 can activate to edit the listed measurements 803. The page 801 also includes the link 703 to return to the Web page 601.

Figure 6:
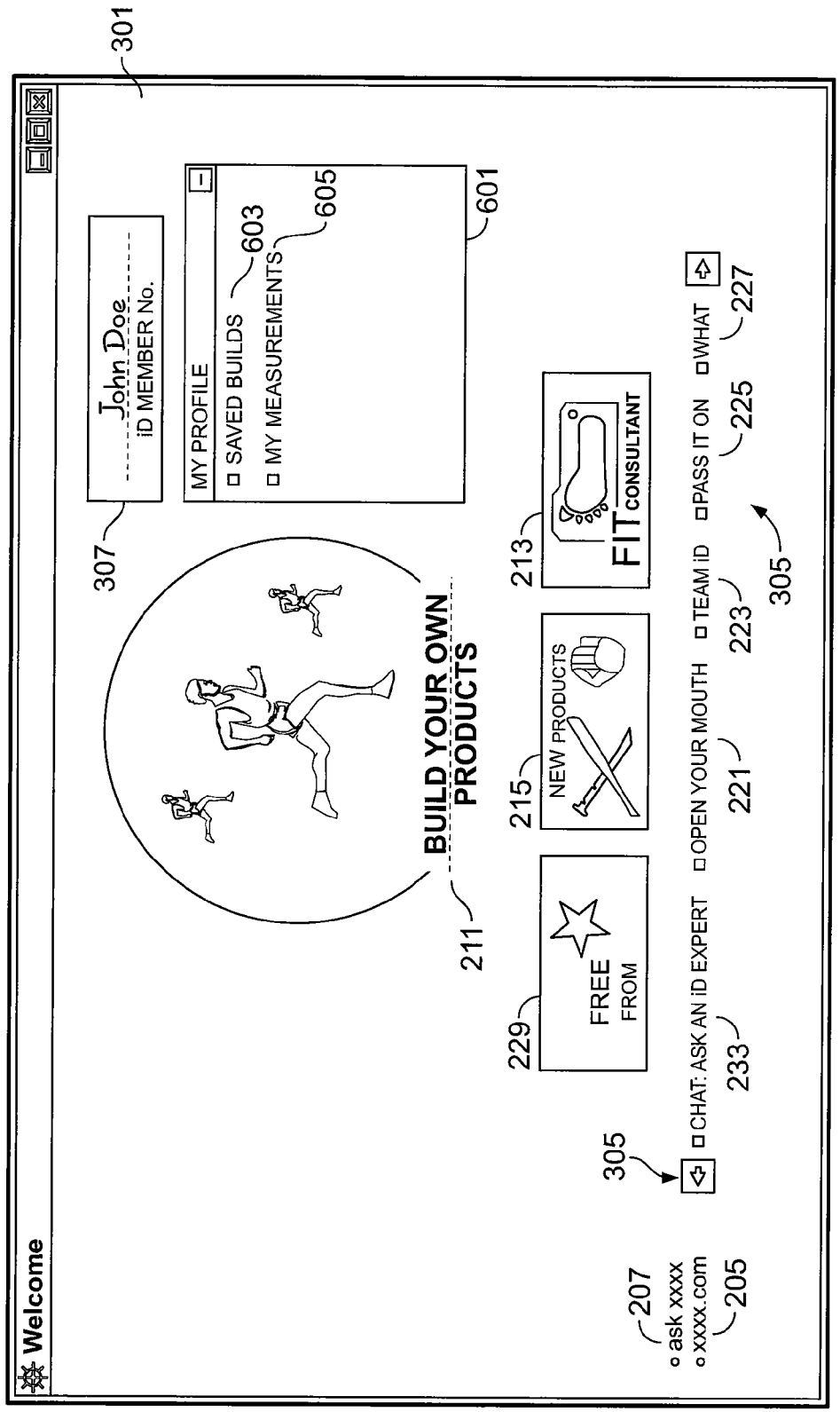

It should be noted that, while the user account according to one embodiment of the invention only contains previous builds and established measurements (as shown in FIG. 6), the user account for other embodiments of the invention may include any information personal to the user. For example, the user account may store a user's favorite articles on athletic topics (or links to those articles) in the database 107 as part of his or her user account. In these alternate embodiments, the additional personal information (or links to this additional personal information) could also be listed in Web page 601.

Returning to FIG. 4, if the customer 109 has not previously established an account with server 105, the customer 109 can use page 401 to create a new account by activating link 409. This link 217 retrieves web page 901, shown in FIG. 9. As seen in this figure, the Web page 901 includes contents 903 explaining, e.g., membership policy, rewards for membership, procedures to register an account with the server 105, etc. Web page 901 also includes a command button or link 905 (not shown in FIG. 2A) that retrieves Web page 1001 shown in FIG. 10. As may be seen from this figure, the Web page 1001 includes a number of fields 1003-1023 in which the customer 109 can enter personal information including, e.g., a user name for the new account to be established with the server 105 and a password to be associated with the new account. After the customer 109 has completed entering his or her personal information into the fields 1003-1023, the customer 109 can then submit the personal information in the fields 1003-1023 to the server 105 by activating the command button 1025 (not shown in FIG. 2A). This information is then delivered to the server 105 to establish a new account.

As will be appreciated by those of ordinary skill in the art, the server 105 may employ specific rules to restrict or control the establishment of customer accounts. For example, the server 105 may use the personal information provided via the Web page 1001 to prohibit customer accounts for customers below a certain age (e.g., 13 years old). Further, as will be known to those of ordinary skill in the art, the server 105 can employ various error messages and follow up Web pages to ensure that the customer 109 submits a minimum amount of personal information before establishing a user account for that customer 109.

In addition to allowing a customer 109 to establish a new user account or log into an existing account as described above, various embodiments of the invention may recognize a customer account established with an affiliated Web site. For example, the invention may recognize and allow a customer 109 to use a user account established with the Web site ABC.com (to which a link 205 is included with the home Web page 203, as previously noted).

After the customer 109 has logged into an existing account with the server 105, or established a new account with the server 105, the server 105 then registers all information obtained from the customer 109 during that session in the database 107 as being associated with that customer 109. That is, all information obtained from the customer 109 during that session is saved in database 107 so as to be associated with that customer's user account. As will become apparent from the description below, this feature can be very useful for custom-manufacturing footwear according to the method and system of the invention.

Figure 8:
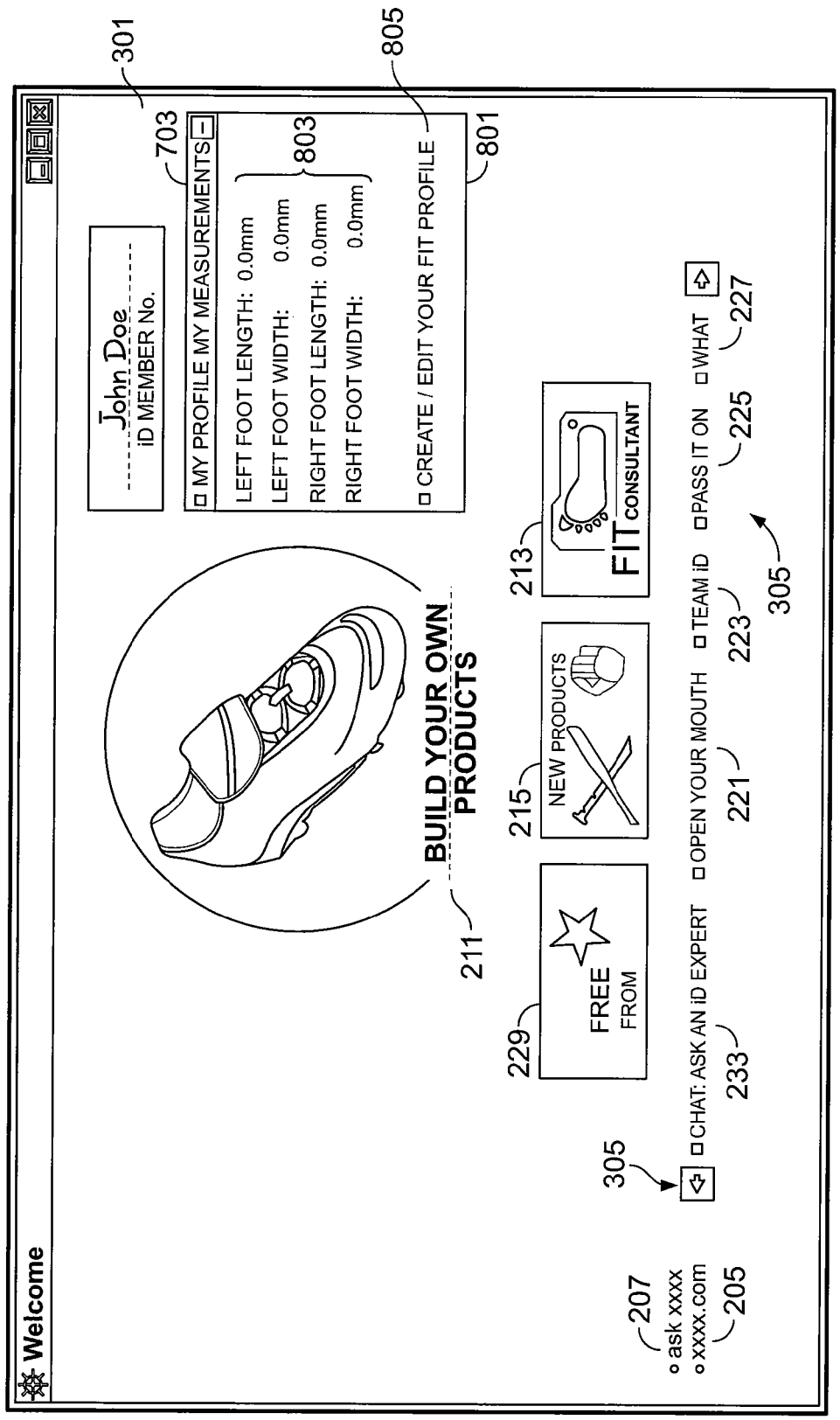
Figure 9:
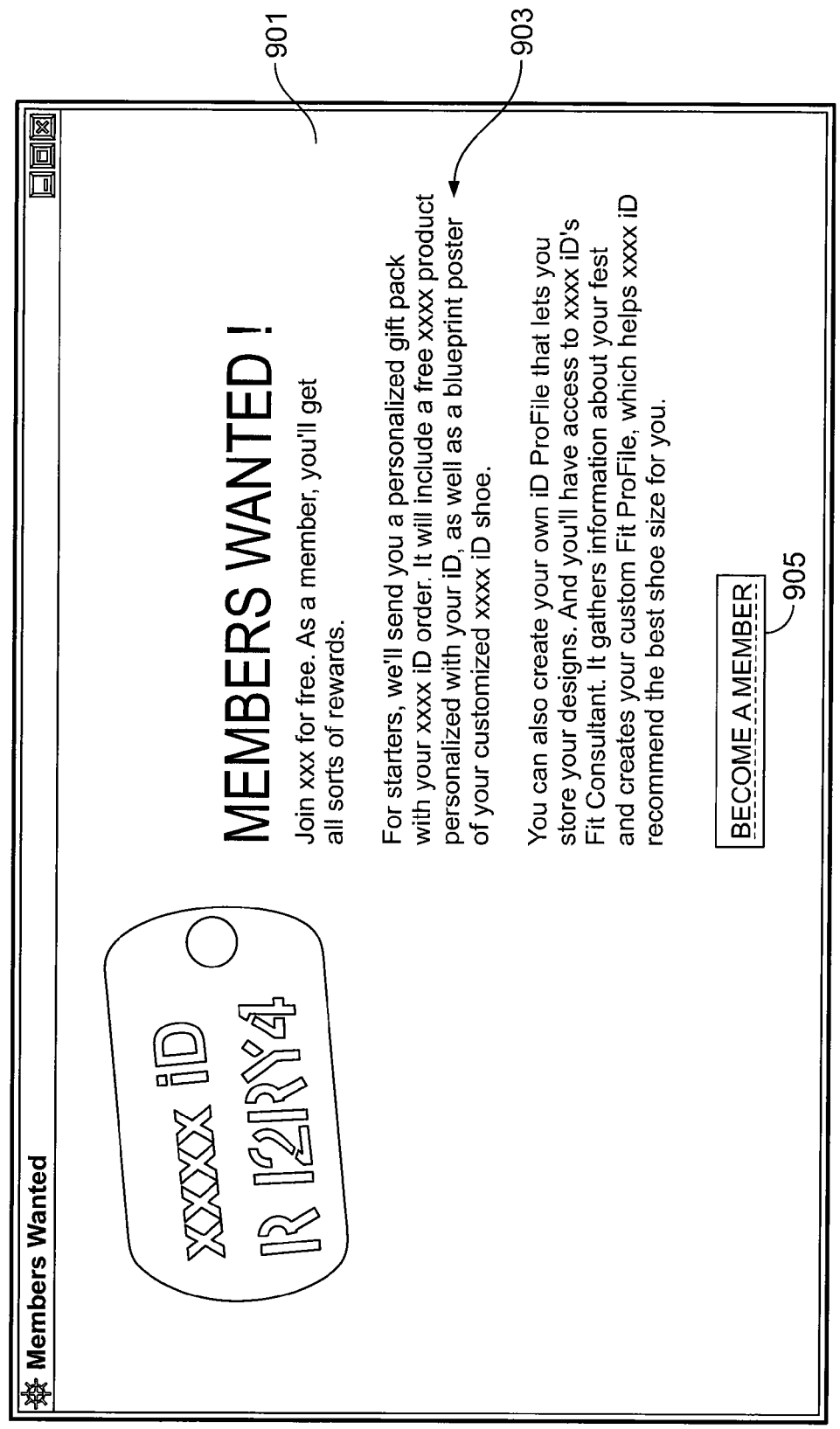
Figure 10:
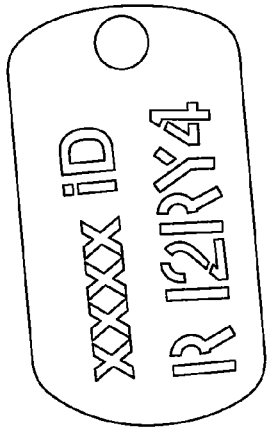

To show that the customer 109 has activated an account (either created a new user account or registered with an existing user account) for the existing session at the Web site 201, the server 103 may modify the appearance of the home Web page 203. For example, the server 103 may modify the appearance of the Web page 203 to include the customer's user name 307 for the customer's account (which is shown as "John Doe" in FIG. 6-8. Also, the server 105 may delete the command button 217 from the home page 203 in favor of, e.g., a command button for link 229, as is also shown in FIGS. 6-8. Still further, the server 105 may maintain the Web page 601 (or its associated Web pages 701 and 801) over the appearance of the home Web page 203, as shown in FIGS. 6-8.

Selecting the Specifications for a Custom-Manufactured Item

To order a custom-manufactured item according to the invention, such as a pair of shoes or athletic equipment, a customer 109 can activate the build command button 211 shown in the home page 203. Alternately, the customer 109 may perform this task by activating either the command button or link 215 (corresponding to the title "New Products") or the command button 213 (corresponding to the title "Fit"). Each one of these procedures will be discussed in detail below.

Figure 11:
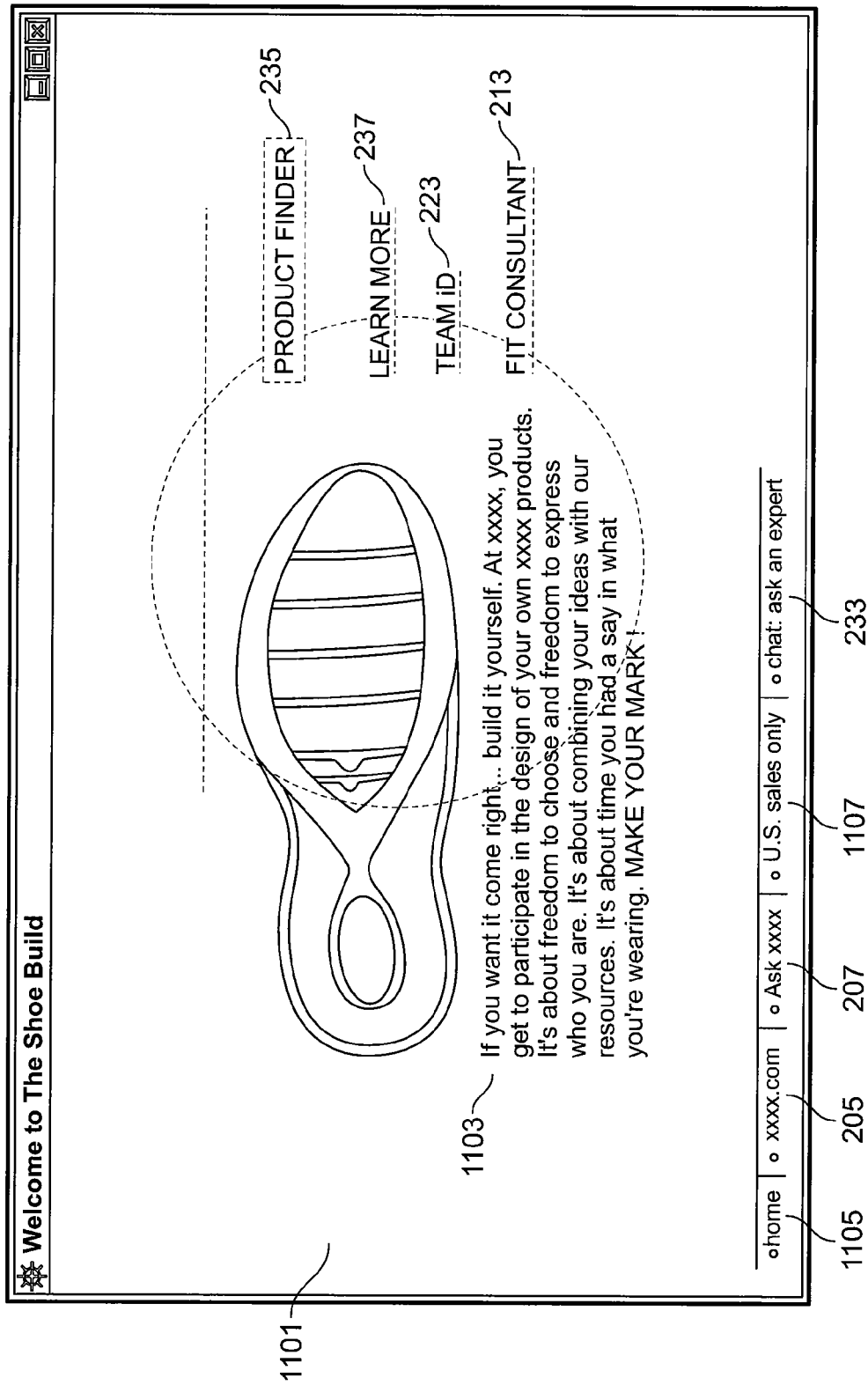

If the customer 109 activates button 211, the server 105 provides the customer's computer device 111 with the Web page 1101 shown in FIG. 11. As seen in this figure, the Web page 1101 contains content 1103 explaining, e.g., the advantages to having footwear custom made by using the invention. As will be appreciated by those of ordinary skill in the art, however, the content 1103 may alternately include, e.g., instructions for employing the system and method according to the invention, recommendations for having footwear custom-manufactured, etc. The content 1103 could also include information regarding a display card described below.

The Web page 1101 also includes command buttons 235, 237, 223, and 213, entitled "Product Finder" (labeled "Build" in FIG. 2A), "Learn More," "Team iD," and "Fit Consultant" (labeled "Fit" in FIG. 2A). It should be noted that links 213 and 223 were mentioned in the discussion of the invention above. As may be seen in FIG. 11, the web page 1101 further includes links 1105 (to retrieve the home page 203), 205, 207, 1107 (to obtain sales policy information), and 233.

If the customer 109 activates command button or link 237, the server 105 provides the customer's computer device 111 with a Web page (not shown) that includes content describing, e.g., the time frame for delivery of custom-manufactured shoes after they have been ordered. The content may also include other information, such as, for example, the retailer's policy on returns, pricing, policies on maintaining privacy of the information provided to the server 105, an explanation of the process for ordering custom-manufactured shoes, etc. Further, this informational Web page may include links to other web pages that provide information regarding the operation of the invention and/or operating policies of the retailer.

Figure 12A:
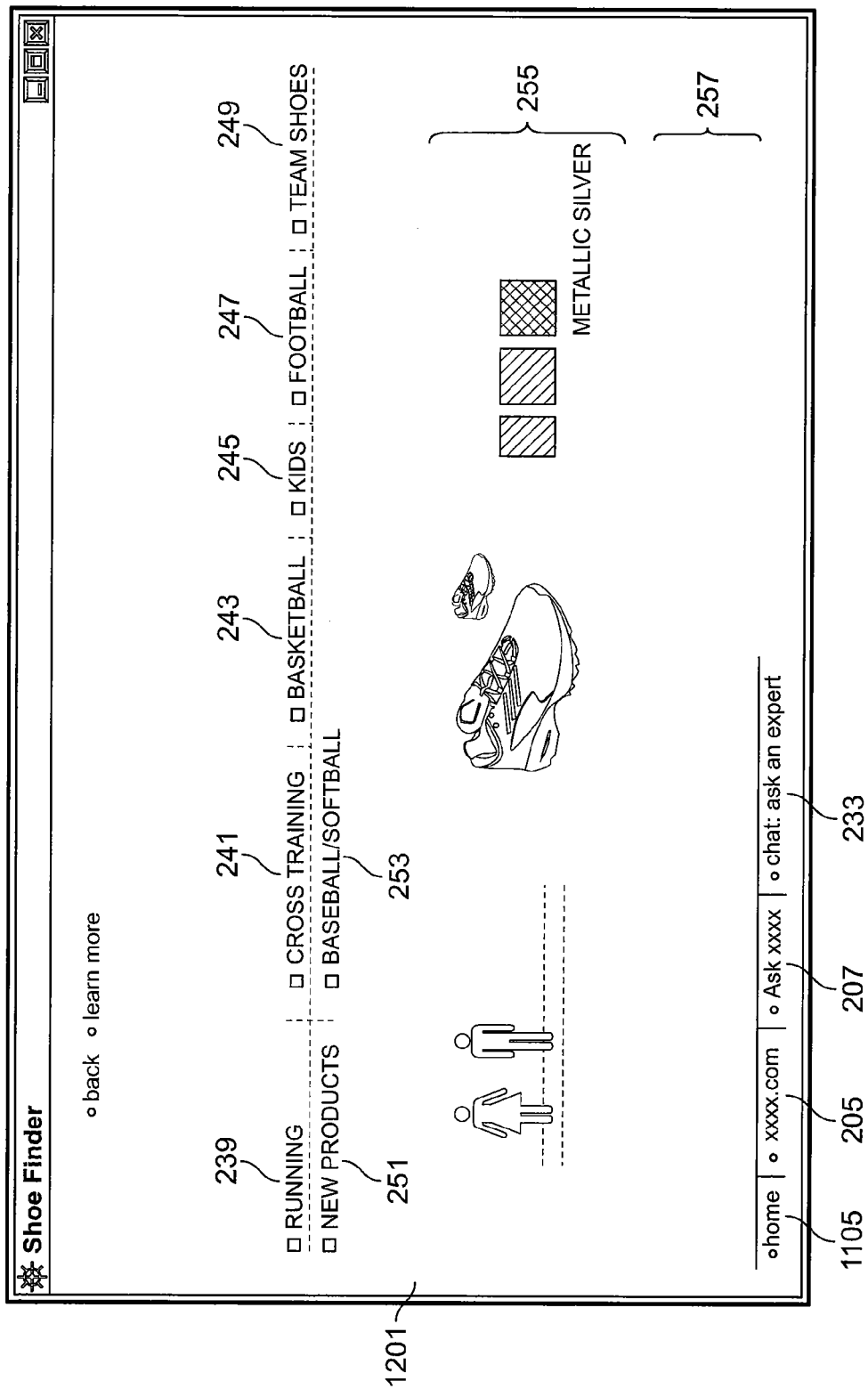
Figure 12B:
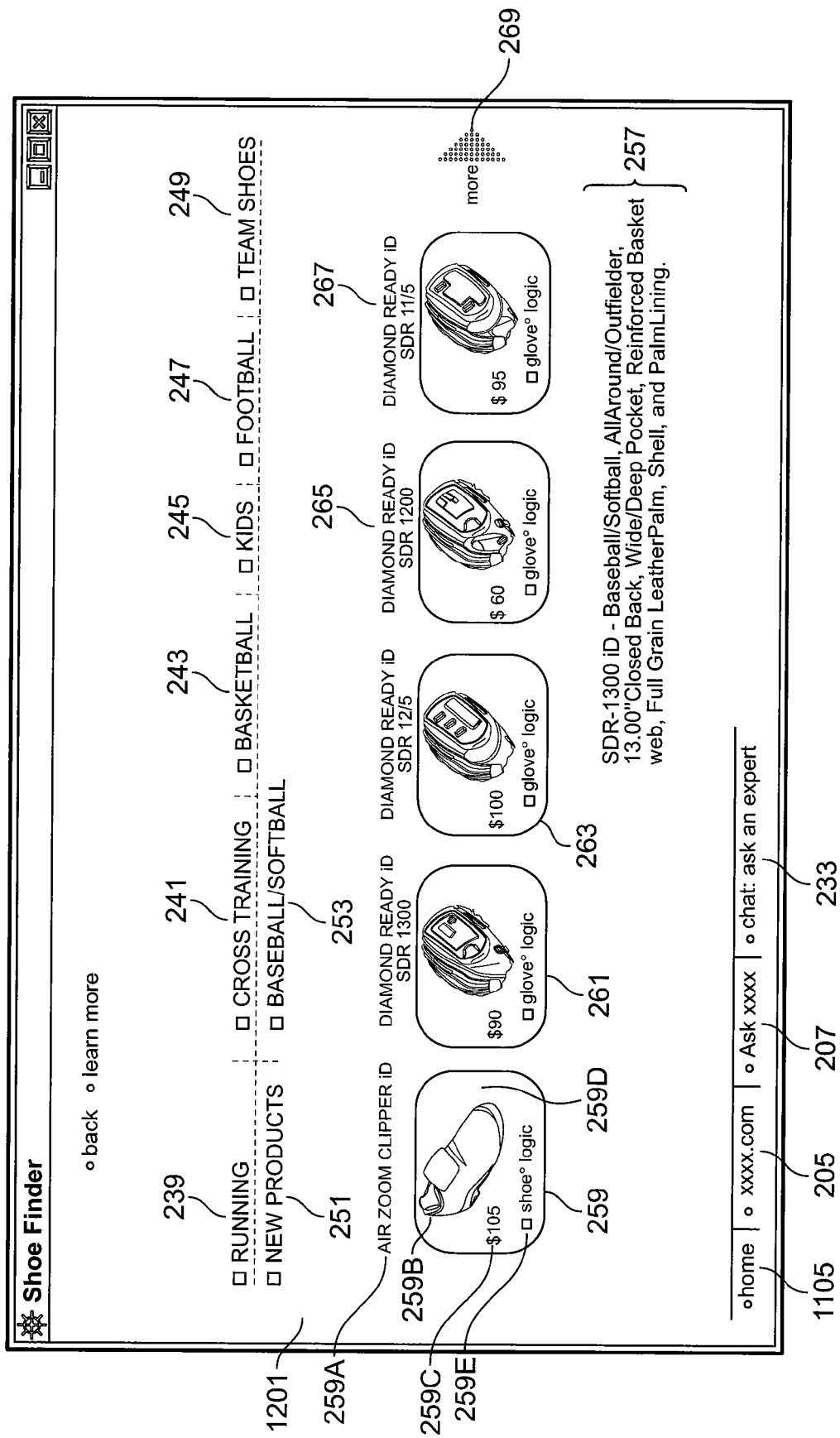
Figure 12C:
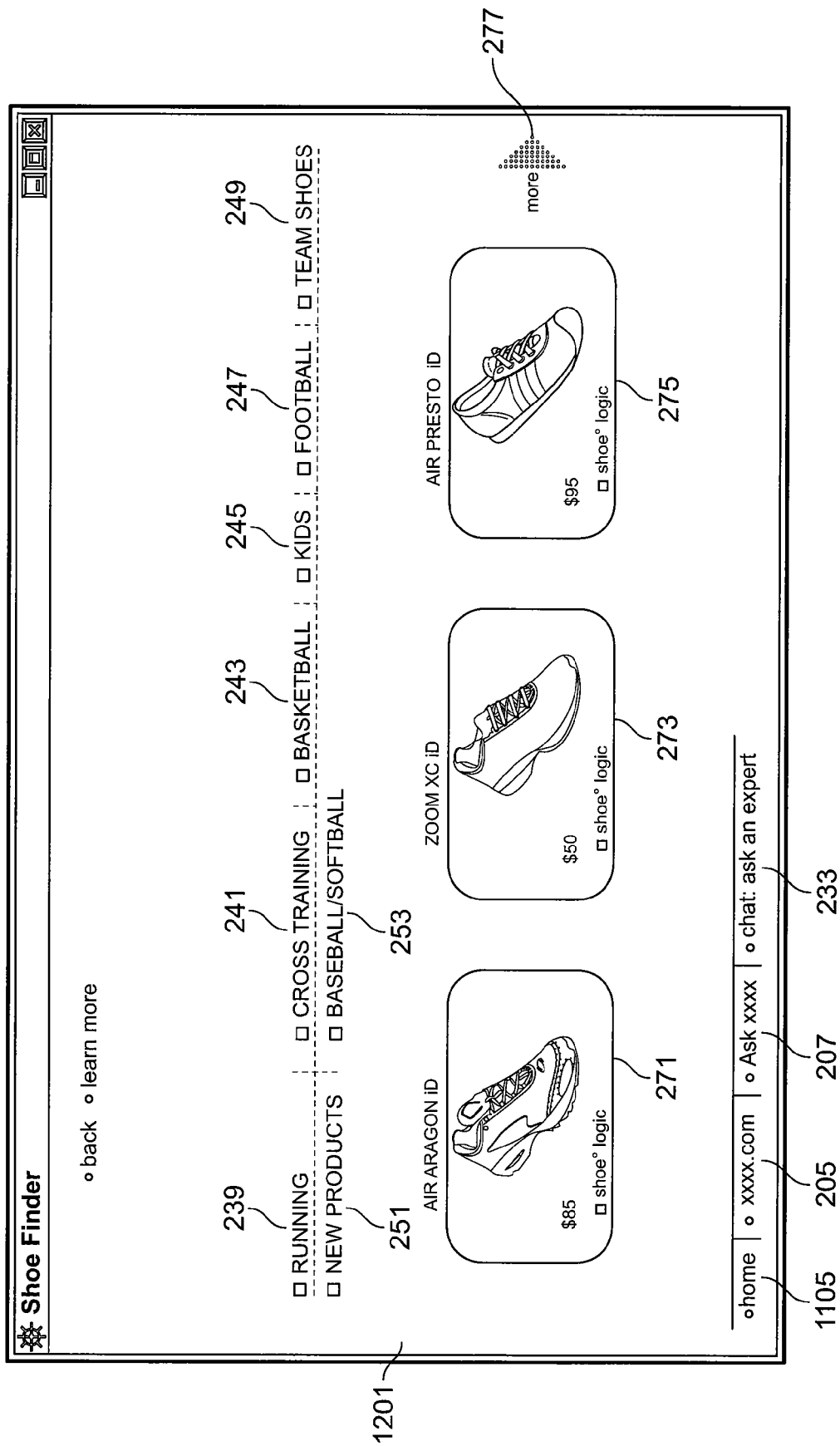

If, on the other hand, the customer 109 activates button or link 235, the server 105 provides the customer's computer device 111 with web page 1201, shown in FIGS. 12A-12C. Similarly, if, rather than employing button 211 to initiate the custom-manufacturing ordering procedure, the customer 109 instead activated button 215 from the home Web page 203, activation of this button similarly instructs the server 105 to provide the customer's computer device 111 with web page 1201.

As may be seen in FIGS. 12A-12C, the Web page 1201 includes command buttons 239-253, corresponding to the titles "Running," "Cross-Training," "Basketball," "Kids," "Football," "Team Shoes," "New Products," and "Baseball/Softball," respectively. The Web page 1201 also includes two display areas 255 and 257. As shown in FIG. 12A, the display area 255 may initially display random images. With the activation of any of the links 239-253, however, the display area 255 displays images and links associated with the activated button.

For example, if the customer 109 activates the command button 251 (corresponding to the title "New Products"), the activation of this command button 251 is transmitted to the server 105. In response, the server 105 then acts (using, e.g., a Java Server Pages technique) to search the database 107 for all of the image/link combinations corresponding to new products. When these image/link combinations have been identified, the server 105 causes the Web page 1201 to display some or all of these image/link combinations. Thus, with the described example ("New Products"), the server causes the Web page 1201 to display image/link combinations 259-267, each combination being associated with a new product (i.e., a product newly available for custom manufacturing). The Web page 1201 may also display a link 269, which, when activated, causes the server 105 to have the display portion 255 display other image/link combinations associated with new products.

On the other hand, if the customer 109 activates the command button 239 (corresponding to the title "Running"), the server 105 causes the display area 255 to display image/link combinations 271-275 associated with running shoes. The display area 255 may also display a link 277 which, when activated, causes the server 105 to have the display portion 255 display other image/link combinations associated with running shoes. A retailer may therefore use the Web page 1201 to show customers image/link combinations for every product that can be custom manufactured. It should be noted that, if the customer 109 retrieved the Web page 1201 directly from the home page 203 using the link 215 (corresponding to the title "New Products"), then the Web page 1201 would initially be presented to the customer 109 with the image/link combinations 259-267 of FIG. 12B rather than random images as shown in FIG. 12A.

Referring specifically now to FIG. 12B, an image/link combination can provide a variety of information to the customer 109. For example, the image/link combination 259 includes an image portion 259A with the name of the product, an image portion 259B showing the product, an image portion 259C showing the price to have the product custom-manufactured, and an image portion 259D providing a gender indicator for the product (i.e., whether the product is unisex, is made for men or women or both, etc.). The image/link combination 259 also includes a link 259E to another Web page (not shown) with content describing the illustrated shoe or other information that may be of interest to a prospective buyer. Further, the collection of images 259A-259D together form a link to a build page for preparing specifications to have the product custom-manufactured, as will be explained further below. Any image/link combination displayed in image area 255 can include some or all of these different types of images and links, or additional images and links according to various embodiments of the invention.

The customer 109 employs the Web page 1201 to review various products to be custom manufactured. It should be noted that, for example, as the customer 109 moves a cursor of his or her computer device 111 over the image/link combination associated with the product in his or her browser program, area 257 may be used to display information relating to that product, as shown in FIG. 12B. After the customer 109 selects a product (e.g., a baseball glove) to have custom-manufactured, the customer 109 activates the link represented by the image portions 259A-259D of the product.

For example, a customer 109 who desires to order a custom-manufactured Diamond Ready SDR-1300 iD baseball glove can activate the link represented by the images in the image/link combination 261 shown in FIG. 12B. By activating this link, the customer retrieves the build process page 1301 (shown in FIGS. 13A-13N) from the server 105. The build process page 1301 will be discussed in detail below.

When an item is selected for custom-manufacturing, the server 105 first checks to determine if the manufacturing facilities for manufacturing that item are capable of filling an order for that item. For example, if a retailer employs a single factory 103 to custom manufacture baseball gloves, that factory 103 may already be operating at full capacity, and thus may not be able to custom manufacture any new baseball gloves in the near future. The retailer will not want the customer 109 to go through the effort of specifying the characteristics to have a baseball glove custom-manufactured only to subsequently discover that the retailer cannot provide the ordered glove in a timely fashion. Accordingly, the server 105 should determine whether the retailer has sufficient manufacturing capability to custom-manufacture the item selected by the customer 109 for custom-manufacturing immediately after it has been selected, which can be accomplished in a number of ways.

First, the server 105 may keep count of the number of products custom-ordered from a particular production facility (e.g., a factory 103), and compare that counted number with the total capacity of the factory 103. For example, if the retailer employs a single factory 103 to custom-manufacture four different models of baseball gloves, and that factory 103 can only manufacture 10,000 total gloves per six week period, this information can be stored in the database 107. Each time one of the four models of glove is custom-ordered, the server 105 updates a counter for that factory 103 in the database 107. If the counter reaches 10,000, then the server 105 can send a warning message to each customer 109 who subsequently selects one of the four models of baseball gloves for custom ordering. The warning message may simply caution the customer 109 that delivery of the glove will take longer than six weeks, or it may prohibit (along with other related operations at the server 105) the customer 109 from ordering the glove altogether. Alternately, or additionally, the server 105 may invite the customer 109 to sign up on a waiting list which may, for example, ensure that the customer 109 is electronically mailed a notice when the item is again available for custom-manufacturing. As previously noted, the warning message is preferably displayed before the customer 109 selects his or her preferences for custom-manufacturing the glove.

Alternately, the server 105 may notify the factory 103 each time a customer 109 selects one of the four models of baseball gloves to order, and request an update as to the factory's manufacturing capability. The factory 103 can then alert the server 105 if it does not have the manufacturing capability to custom manufacture the selected glove model on a timely basis, so that the server 105 can send a warning message to the customer 109. Other techniques for monitoring manufacturing capability will also be apparent to those of ordinary skill in the art based upon this teaching.

Figure 13A:
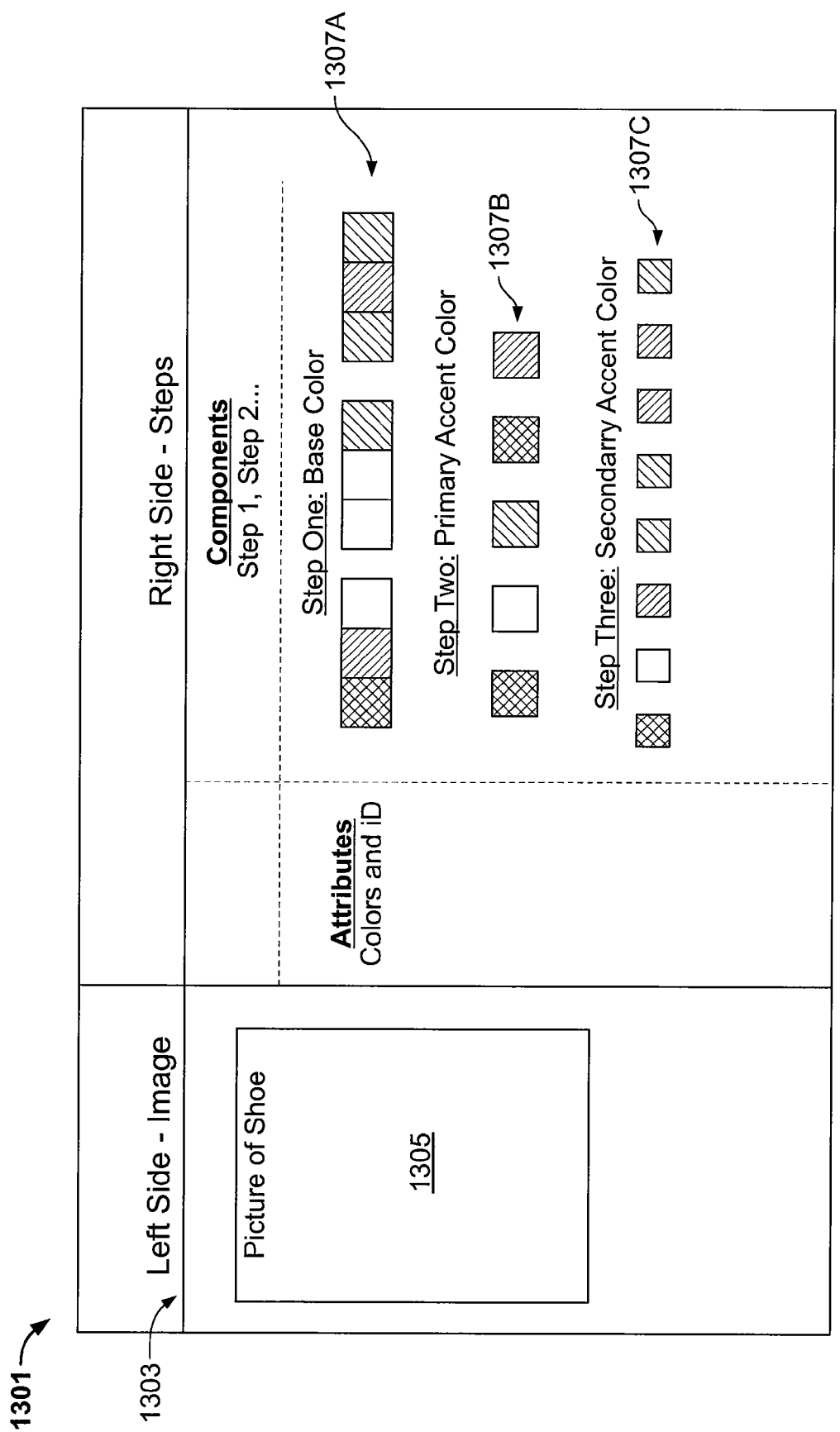

Referring back to the Web page 1301, this page may preferably be organized as a template 1303 using different components 1305, 1307, as shown in FIG. 13A. With this arrangement, the template 1303 provides a basic frame that contains one or more components 1305, 1307, which act together as subframes for generating the Web page 1301. Thus, images and content can be adjusted in the template by switching the content of the subframes, without needing to revise the remaining portion of the page. As is known in the art, this type of Web page can be accomplished by using dynamic hypertext mark-up language (DHTML).

FIG. 13A illustrates the basic frame template 1303 for the Web page 1301 according to one embodiment of the invention. The template 1303 contains an image component 1305 on its left side, for receiving selection or characteristic information from a customer and then displaying an image based upon that information. For example, when the customer 109 activates an image/link combination to select a product for custom-manufacturing, the server 105 provides this information to the component 1305, which then creates or retrieves an image corresponding to the selected product. This image is then incorporated into the version of the Web page 1301 delivered to the customer 109 in response to the customer's activation of the image/link combination to select the product. Again, the component 1305 may operate using, e.g., Java Script Pages techniques or other similar technique known in the art.

The right side of the template 1303 contains one or more step or characteristic components 1307. Each component 1307 corresponds to an attribute or characteristic of the item that can be designated by the customer 109. For example, the component 1307A is for designating the base color of the item to be custom-manufactured, the primary accent color of the shoe to be custom-manufactured. Based upon the product selected by the customer, the component 1307 creates or retrieves an image showing the base colors or color combinations that are available for that particular product. This image is then also incorporated into the version of the Web page 1301 delivered to the customer 109 in response to the customer's selection of the product.

Figure 13B:
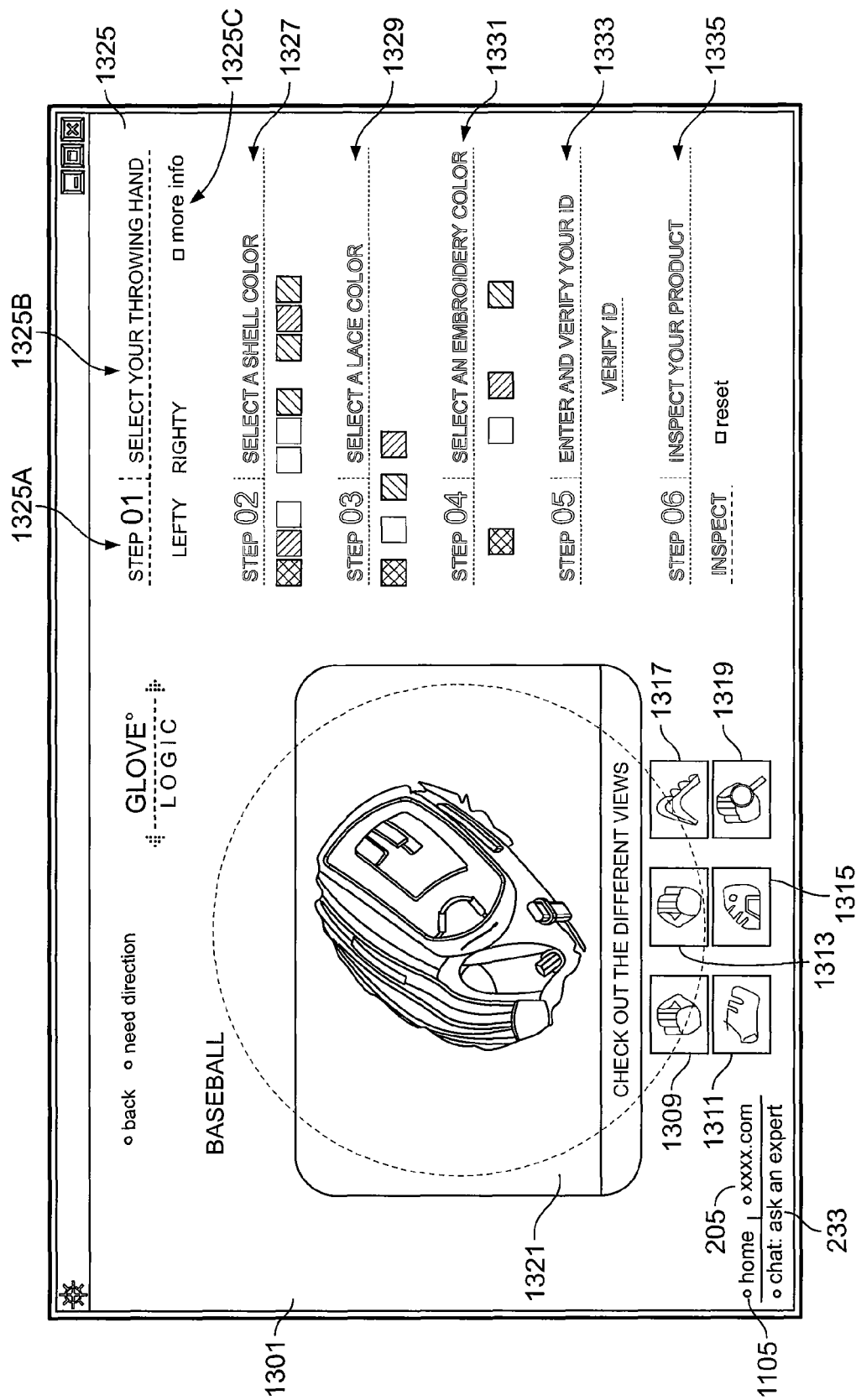

FIG. 13B illustrates one version of a Web page 1301. This version of the Web page 1301 corresponds to the customer 109 selecting the image/link combination 261 for a Diamond Ready iD SDR 1300 baseball glove. Accordingly, the component 1305 has caused the page 1301 to include an image file containing several image/link combinations 1309-1319 and image 1321. Image/link combinations 1309-1319 show the back view, side view, front view, bottom view, top view, and fabric zoom view of the selected glove. Image 1323 then displays a blown-up view corresponding to the view in one of the image/link combinations 1309-1319 (image/line 1309 in FIG. 13B). The customer 109 can change the displayed blown-up view of image 1321 simply by selecting the command or link represented by one of the image/link combinations 1309-1319 showing that view. When the customer 109 selects a different view, this information is conveyed to the server 105. The component 1305 then uses this information to generate a different image file with the image 1321 showing the different view. The server 105 subsequently refreshes the Web page 1301 to display the images in this new image file.

Based upon the customer's selection of the image/link combination 261 for a Diamond Ready iD SDR 1300 baseball glove, the server 105 includes various components 1307 corresponding to the customizable characteristics in the template 1303. As apparent from the image/links combinations shown in FIG. 13B, the template 1303 for this page 1301 contains components 1307 for designating the throwing hand for the glove, the shell color for the glove, the lace color for the glove, the embroidery color for the glove, and the iD text (to be explained in detail below) for the glove. The template 1303 also contains a component 1307 for allowing the customer 109 to inspect his or her specifications for the glove after the specifications have all been designated.

As shown in FIG. 13B, in response to the customer's selection of the image/link combination 261, the component 1307 for designating the throwing hand provides the Web page 1301 with the image/link combination 1325. This image/link combination 1325 includes a title section 1325A displaying the title "Step 1", an instruction section 1325B displaying the instruction "Select Your Throwing Hand," and a link section 1325C providing the links entitled "Lefty," "Righty", and "More Info." With some preferred embodiments, the image/link combination 1325 includes Java code (or equivalent code) that changes the text displayed in the instruction section 1325B. For example, when the customer 109 moves the cursor over the link entitled "Lefty," the text in the instruction section 1325B may change to "Throws With Left Hand."

As can be seen in FIG. 13B, the remaining components 1307 contained in the template 1303 for this page 1301 also provide image/link combinations 1327-1335, each with a title section, an instruction section, and a link section. These image/link combinations 1327-1335 are inactive, however, as they have not received the appropriate input to generate active image/link combinations.

To begin selecting the specifications for custom-manufacturing the glove, the customer 109 activates one of the two links "Lefty" and "Righty" in the link section 1325C. The selection of one of the links is conveyed back to the server 105, which submits this information to the relevant components 1305, 1307 in the template 1303. For example, the server 105 provides this selection to the component 1305. If the selected glove configuration is different from that currently shown in the image 1323, the component 1305 retrieves a new image 1323 corresponding to the selected configuration, and the Web page 1301 is refreshed using that new image. Also, the selection of one of the links is conveyed to the component 1307 corresponding to the selection of a shell color. This component then generates an active image/link combination 1327, and the Web page 1301 is refreshed to include the active image/link combination 1327 as shown in FIG. 13C.

Figure 13C:
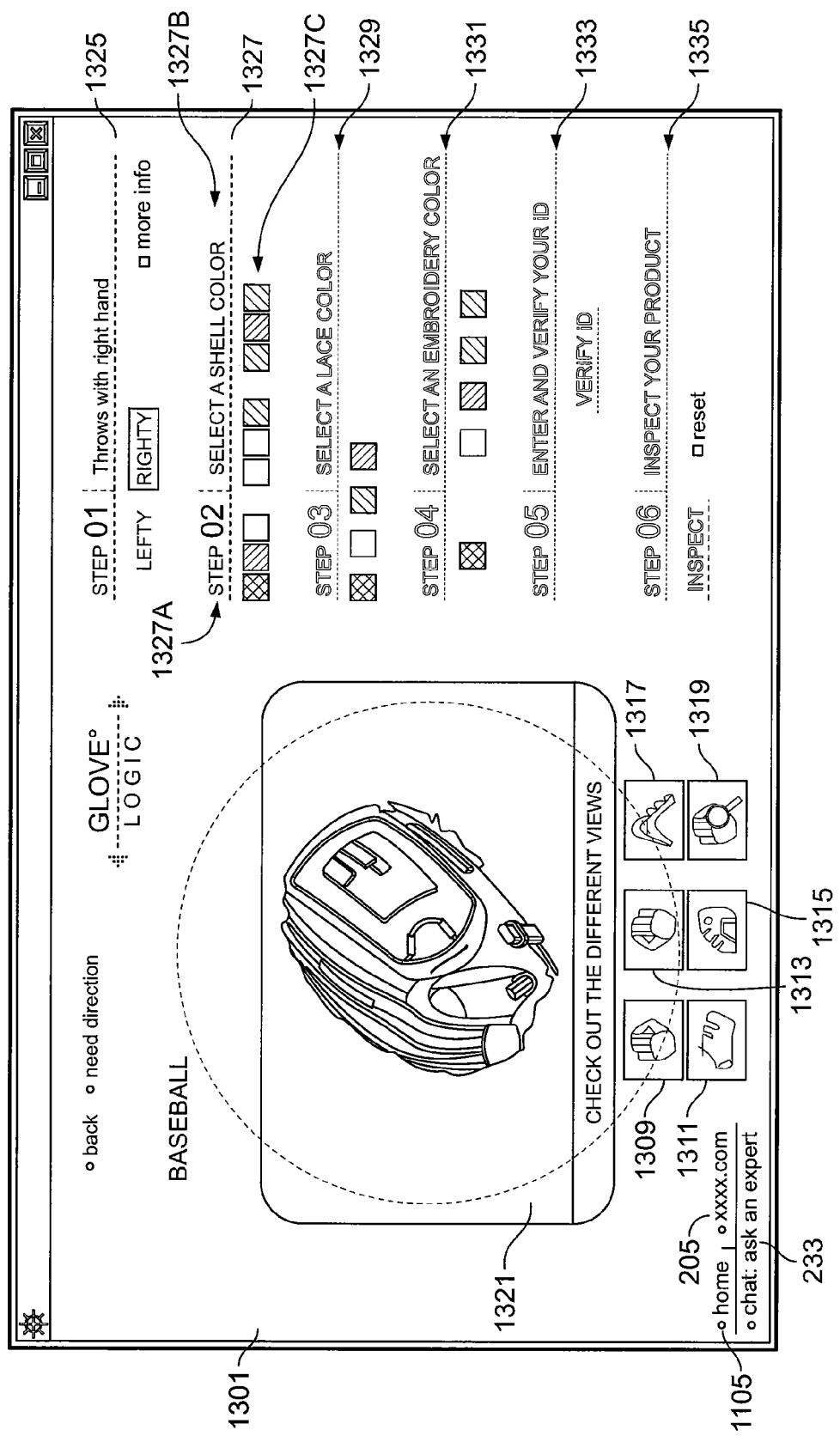

As seen in FIG. 13C, the image/link combination 1327 includes a title section 1327A displaying the title "Step 2", an instruction section 1327B displaying the instruction "Select A Shell Color," and a link section 1327C providing three links for the shell color combinations "Black/Black/Black," "Chocolate/Chocolate/Chocolate," and "Golden/Golden/Golden." Again with some embodiments of the invention, the image/link combination 1327 may also include Java code (or equivalent code) that changes the text displayed in the instruction section 1327B to provide identifying text for each color combination as the customer 109 moves the cursor over the link for that combination. Again, the image/link combinations 1329-1335 are inactive in this version of the Web page 1301.

Figure 13D:
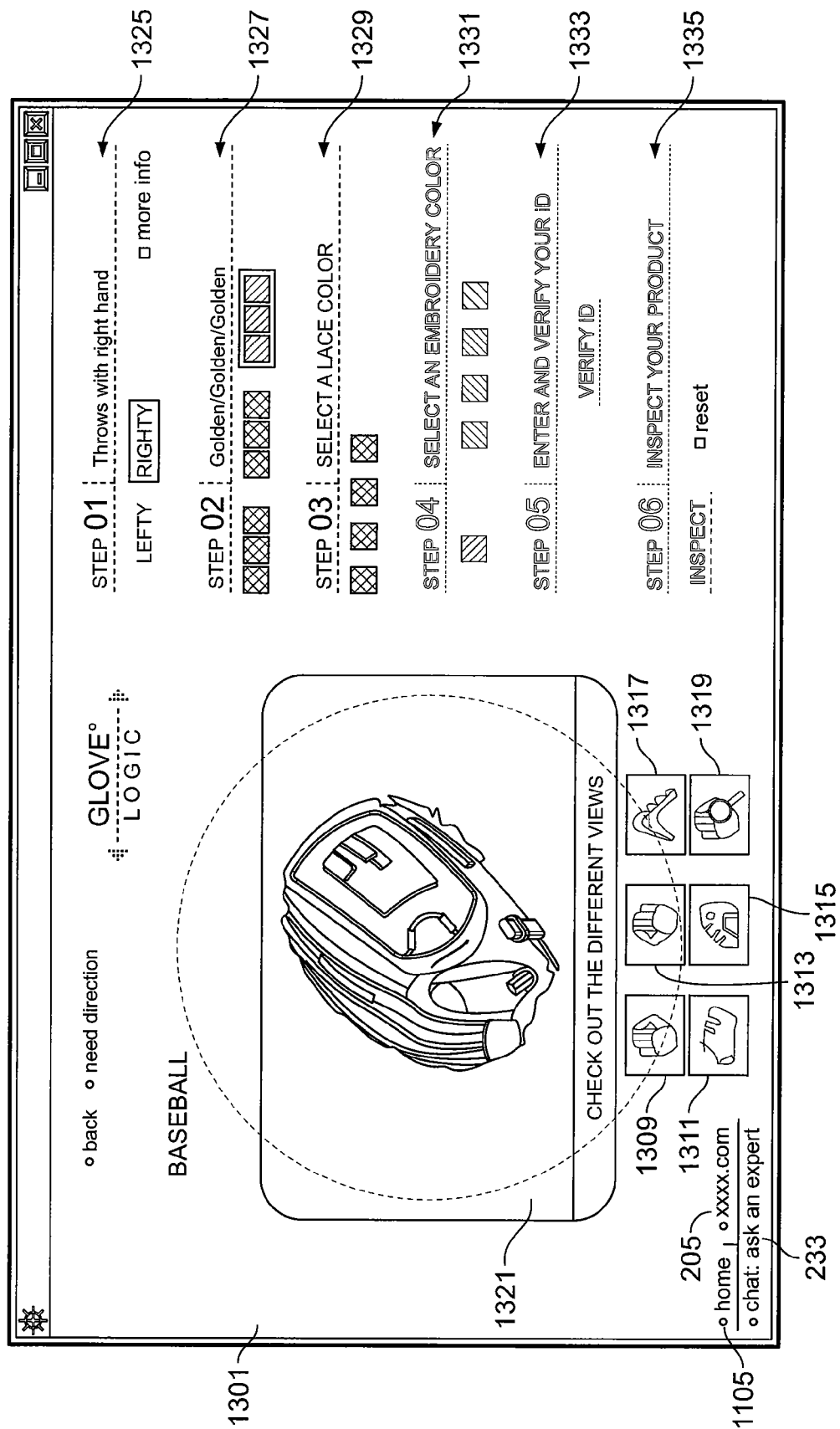

When the customer 109 activates one of the three links in the link section 1327C to select a color combination for the glove shell, this selection is conveyed back to the server 105. The server 105 then delivers this information to the relevant components 1305, 1307 in the template 1303. For example, the server 105 provides this selection to the component 1305, which retrieves new images 1309-1323 corresponding to the selected color combination. Further, the selection of a shell color combination is conveyed to the component 1307 corresponding to the selection of a lace color. This component 1307 then generates an active image/link combination 1329, and the Web page 1301 is refreshed to include the active image/link combination 1329 and the new images 1309-1323 as shown in FIG. 13D.

Figure 13E:
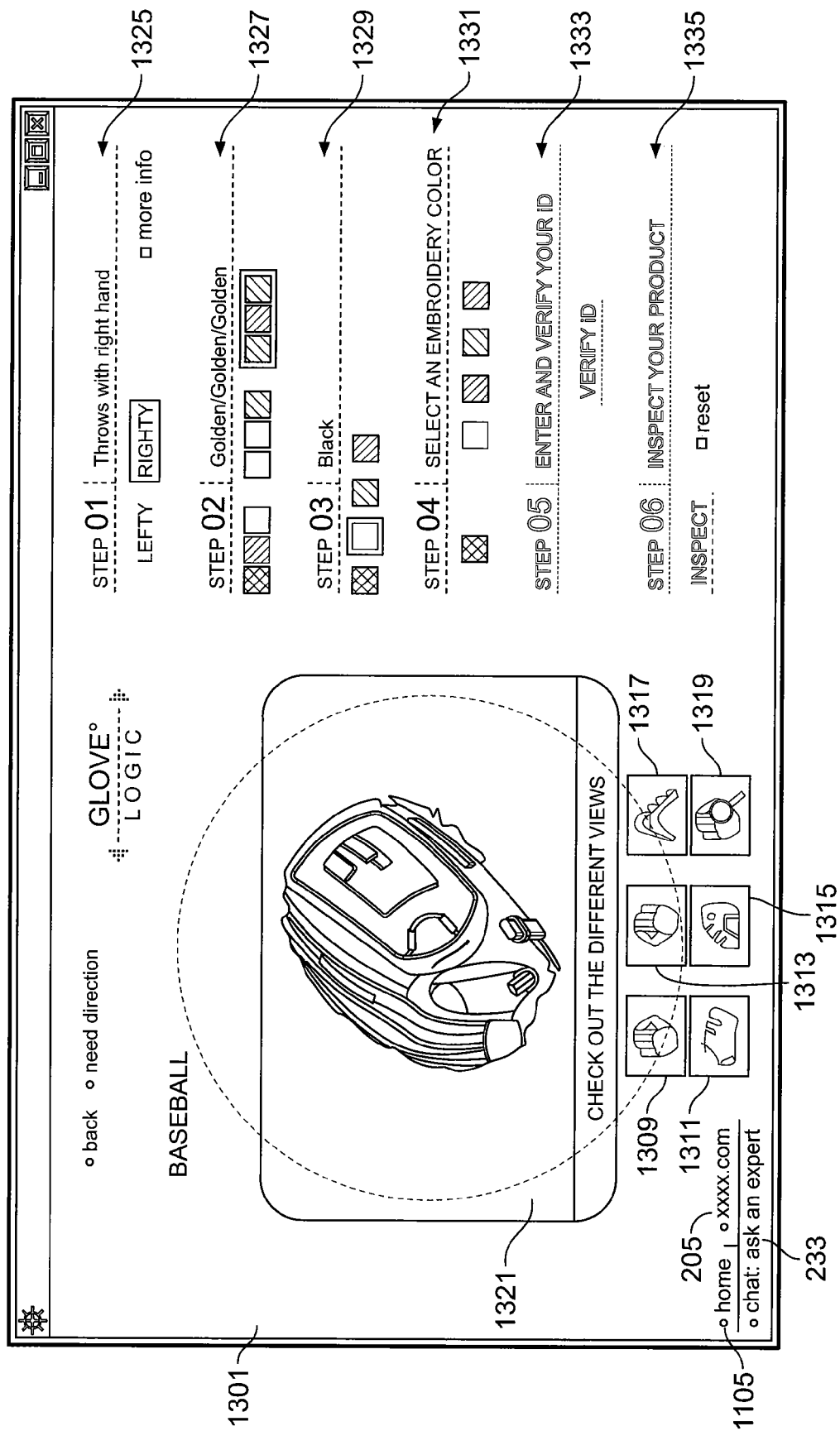
Figure 13F:
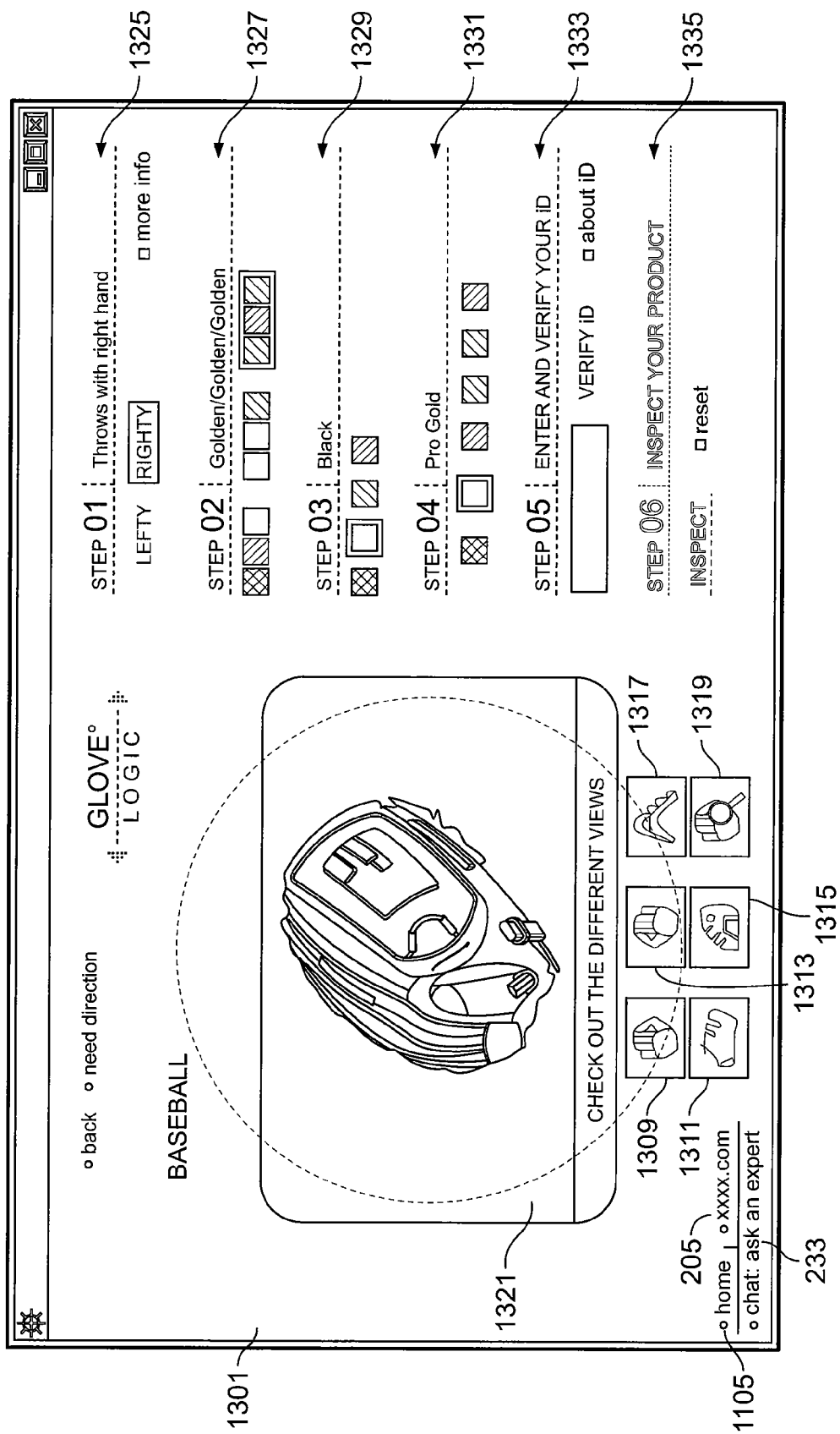

Next, the customer 109 then selects the lace color for the glove using the links provided in the link section 1329C of the image/link combination 1329 (with the selection of a link in link section 1329C activating the image/link combination 1331, as shown in FIG. 13E). The customer 109 then selects the embroidery color of the glove using the links provided in the link section 1331C of the image/link combination 1331. As may be seen in FIG. 13F, this causes the component 1307 for designating the iD text for the glove to activate the image/link combination 1333.

Figure 13G:
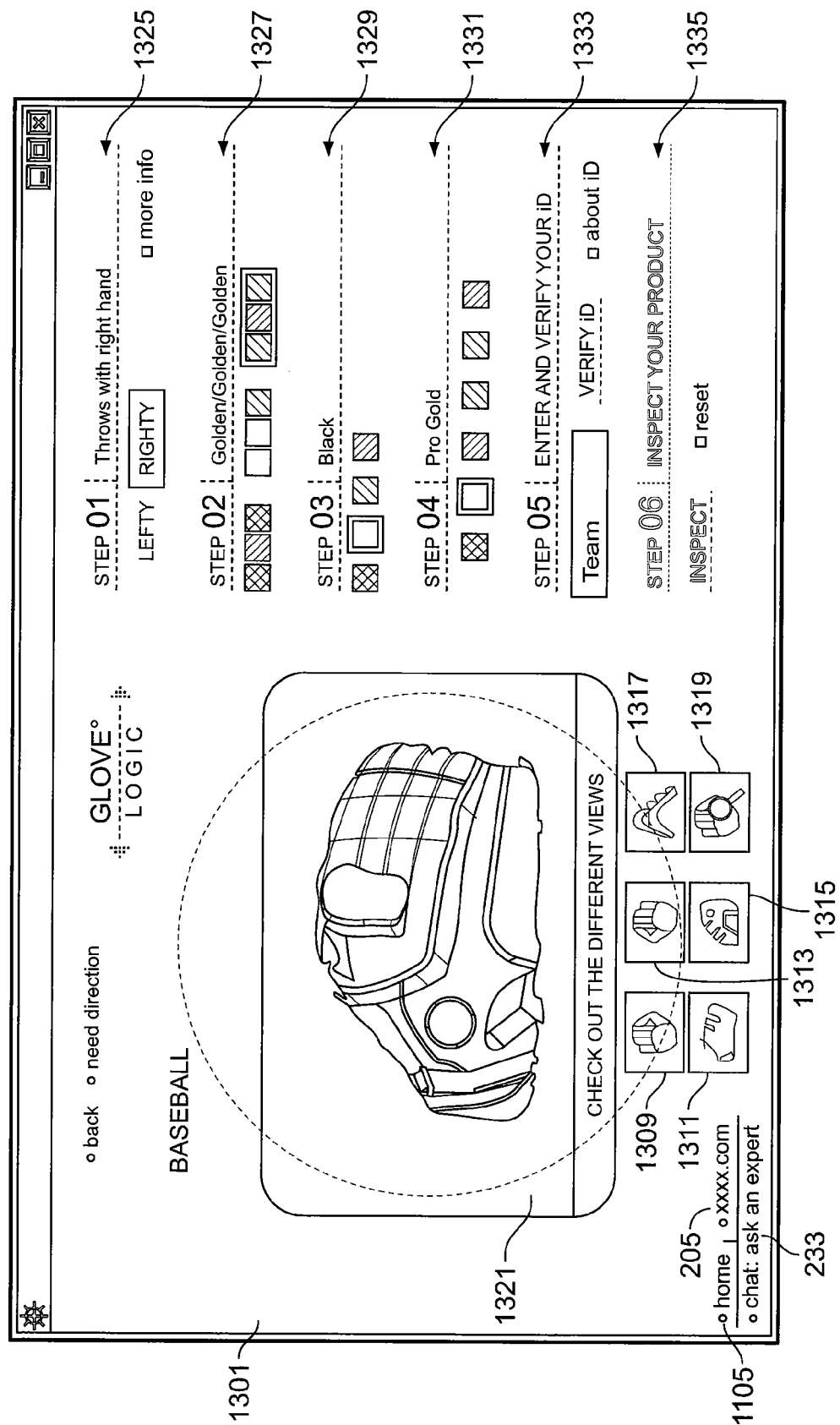

This feature of the invention allows a customer 109 to designate text, such as a personal name, a team name, or a slogan, to be printed (or embroidered, applied, etc.) on the glove. Accordingly, the link section 1333C of the image/link combination 1333 includes a field where the customer 109 can enter the text he or she desires to have appear on the glove. When this text is entered the component for designating the iD text receives this information, and generates a new image/link combination 1333 having an active link entitled "Verify iD" in the link section 1333C. Also, the component 1305 receives this information, and retrieves a new image file that has the image 1323 showing the view that best shows the location where the text will appear. The Web page 1301 is then refreshed to include the new image file and image/link combination 1333, as illustrated in FIG. 13G.

When the customer 109 is satisfied with the text to appear on the glove, the customer 109 activates the link entitled "Verify iD" to have the retailer approve the text. The retailer may want to avoid custom-manufacturing items with text that is trademarked, profane, or intentionally derogatory or insulting to a group or organization of people. On the other hand, the retailer does not want to have a customer 109 select text to appear on the item, only to find out some time later that the retailer has not approved of the text and will not include it on the custom-manufactured item.

Accordingly, some preferred embodiments of the invention will immediately review the text for the retailer's approval. For example, the server 105 may submit the text proposed by the customer 109 to the database 107. The database 107 can then compare the text with a previously determined set of prohibited words and phrases, to automatically approve or disapprove of the text. Other embodiments of the invention will manually screen the text, i.e., immediately provide the text proposed by the customer 109 to a live human being to approve or disapprove. Still further, some embodiments of the invention may employ both a search of prohibited words in database 107 and a manual review of the text proposed by the customer 109. Of course, if the text is disapproved, the server 105 can provide some type of error message to the customer 109 indicating that the proposed text has been disapproved.

Figure 13H:
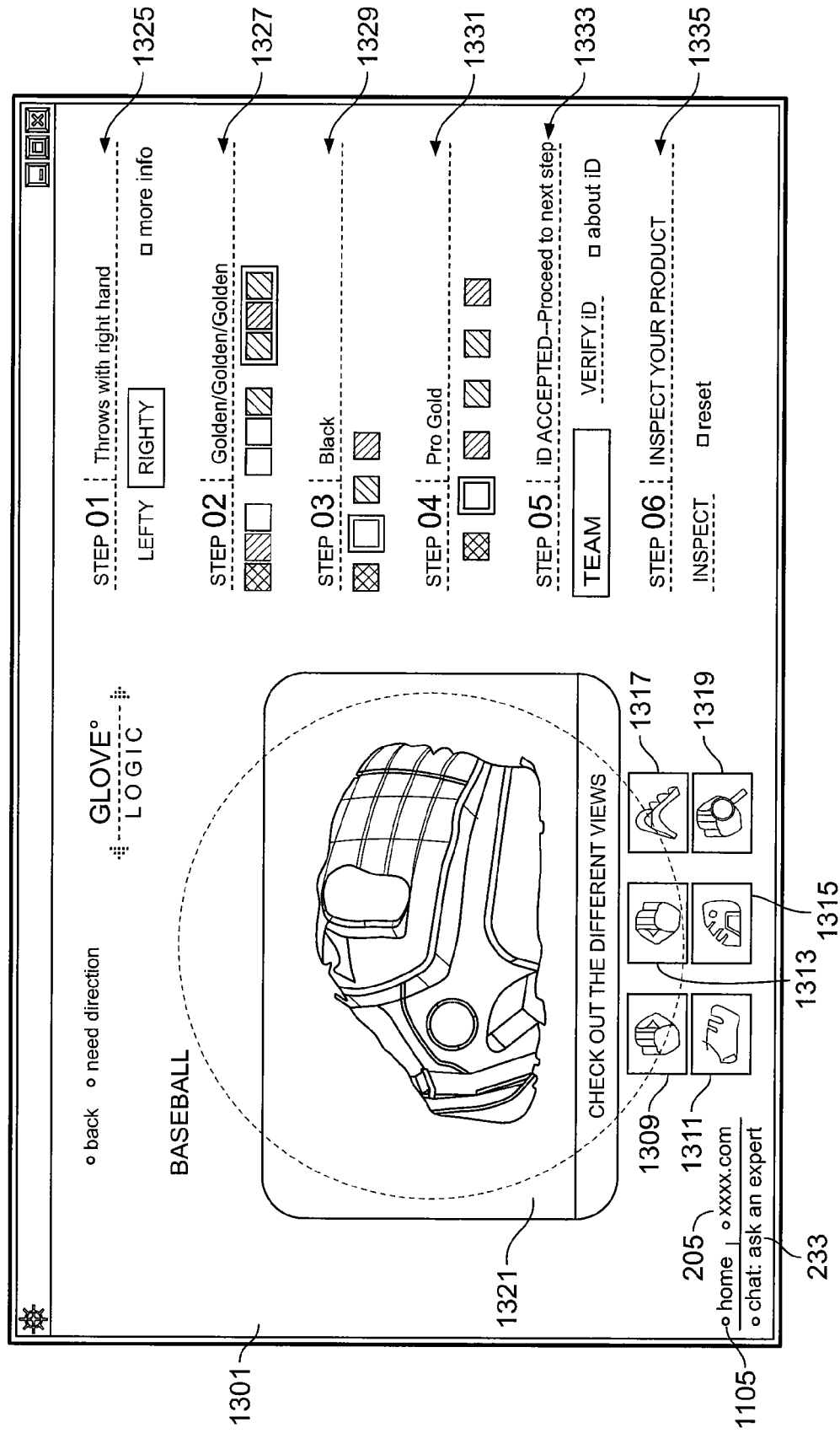

After the text proposed by the customer 109 has been approved, this information is provided to the component 1307 for allowing the customer 109 to inspect his or her specifications for the glove after the specifications have all been designated. In response, the component 1307 generates an active image/link combination 1335, and the Web page 1301 is refreshed to include this active image/link combination 1335 as shown in FIG. 13H. This feature will be discussed in detail below.

Figure 13I:
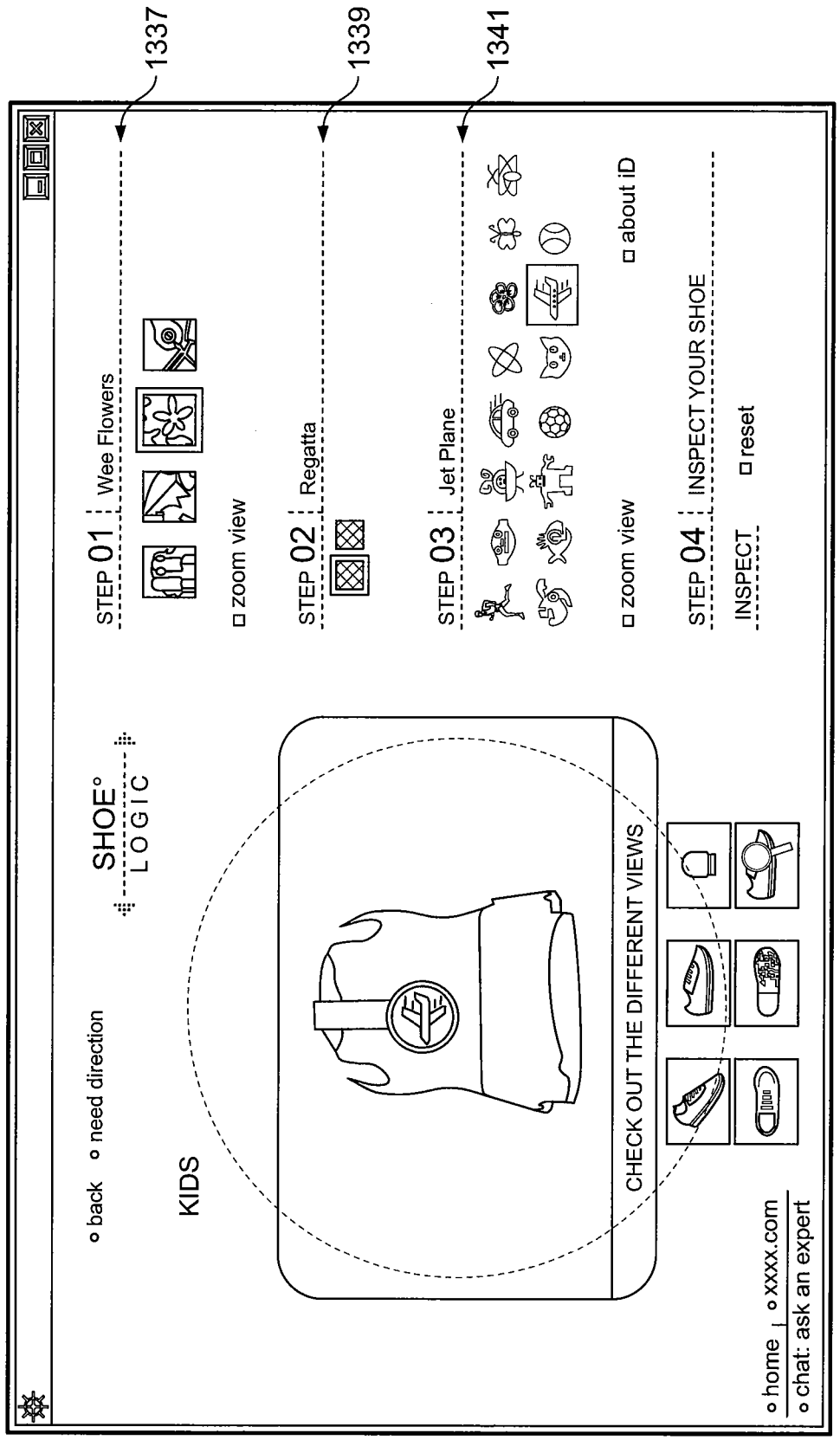
Figure 13J:
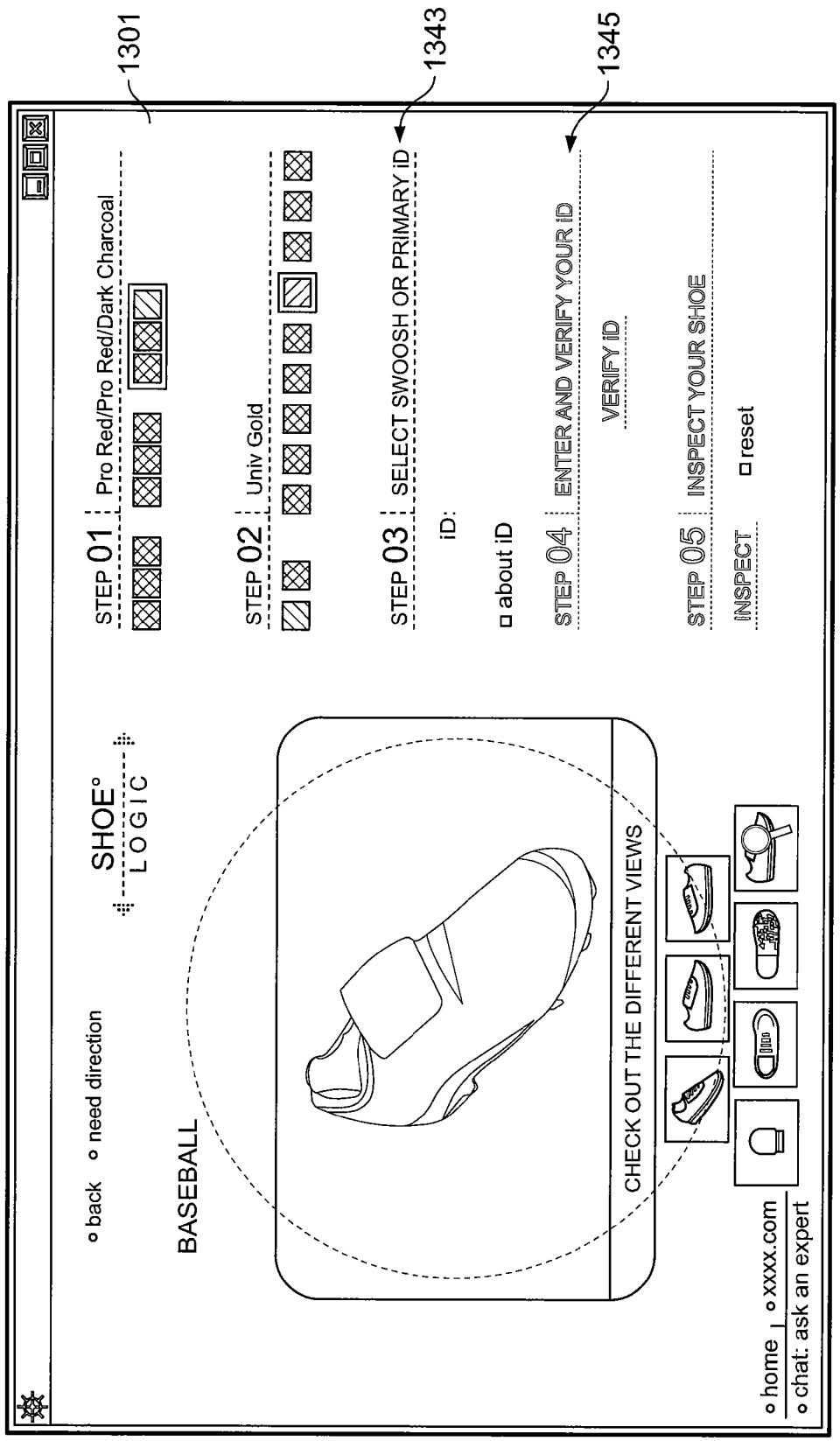

In addition to components 1307 that allow the customer 109 to designate color combinations, components 1307 can also be employed to allow a customer 109 to designate patterns, logos, and multiple texts to appear on the manufactured item. For example, FIG. 13I illustrates an image/link combination 1337 that allows a customer 109 to select one of several graphic patterns to appear on the associated shoe. Image/link combination 1339 then allows the customer 109 to pick a color for the selected graphic pattern. Further, the image/link combination 1341 allows the customer 109 to select a logo to appear on the shoe. FIG. 13J shows an image/link combination 1343 that allows a customer 109 to select between a logo and text to appear on a location of a shoe. This figure also shows an image/link combination 1345 (not active in the figure) that permits a customer 109 to select text to appear at a second location on a shoe.

Components 1307 can also be used that allow a customer 109 to designate structural parts or components of a shoe. For example, a template 1303 could include a component 1307 that allows a customer 109 to select between different upper portion materials for a shoe, a component 1307 that allows a customer 109 to select between different midsole structures for a shoe, a component 1307 that allows a customer 109 to select between different airbags for a shoe, a component 1307 that allows a customer 109 to select between different outsole structures for a shoe, a component 1307 that allows a customer 109 to select between different foot shapes or widths for a shoe, etc.

As previously noted, the component 1305 may generate a new image file for the Web page 1301 each time the customer 109 designates a new characteristic for the item being ordered, so that all of the images of the item presented on the Web page 1301 show how the item will look with that characteristic (together with the previously selected characteristics). With some embodiments of the invention, these image files can be previously generated for every possible combination of customizable characteristics for an item. The component 1305 can then select the appropriate previously generated image file as it receives the customer's characteristic selections. Alternately, the server 105 can provide image files for each characteristic (e.g., a red design element, a green design element, blue mesh upper material for a shoe, green mesh upper material for a shoe, etc.). These characteristic image files can then be used to generate one or more larger image files of the entire item on demand, using a generator program such as Macromedia Generator.

Figure 12D:
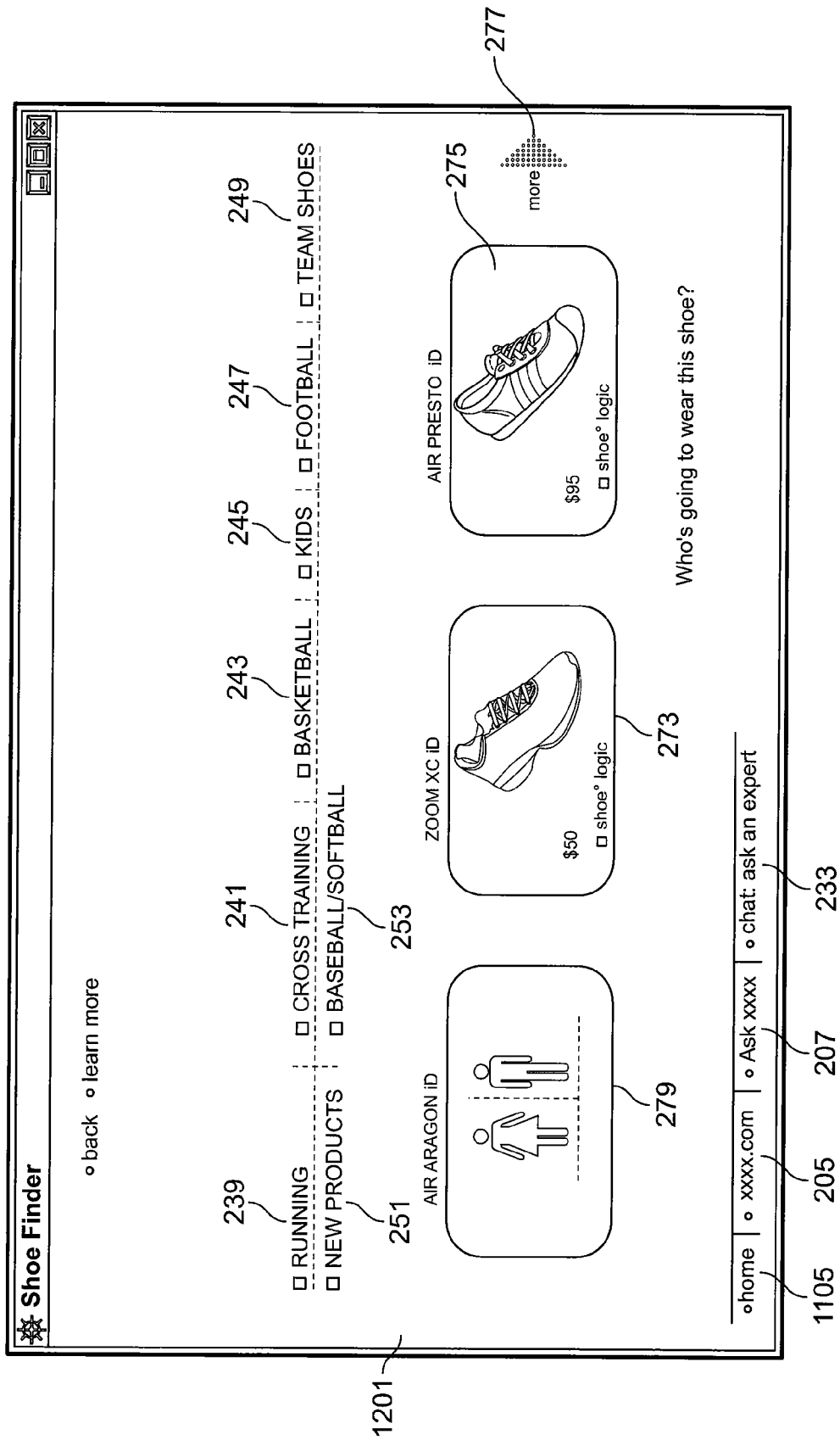

Preferably, the components 1305 and 1307 of the Web page 1301 cooperate together, so that the selection of information in an image/link combination provided by one component can affect the generation of an image/link combination by another component. For example, if a customer selects the image/link combination 271 of the Web page 1201 shown in FIG. 12C, the server 105 refreshes the Web page 1201 to replace the image/link combination 271 with the image/link combination 279 shown as shown in FIG. 12D. This image/link combination 279 allows the customer 109 to select whether to order a women's shoe or a men's shoe.

Figure 13K:
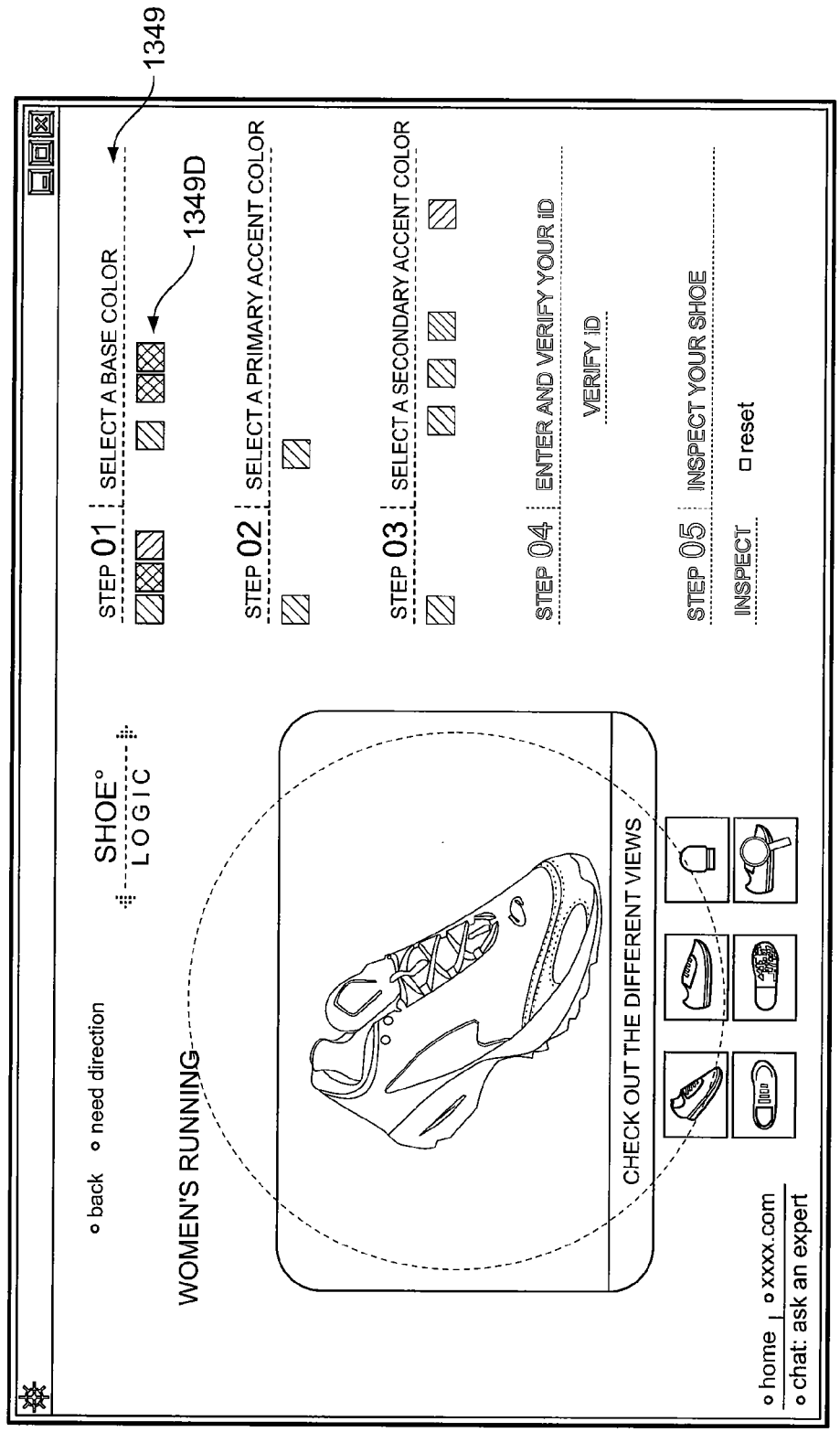

If the customer 109 selects the link represented by the image of the woman in the image/link combination 279, the component for designating a base color for a shoe receives this selection and generates the image/link combination 1349 shown in FIG. 13K. This image/link combination 1349 includes links 1349D for designating any one of the three color combinations "Light Zen Grey/Cool Grey/Metallic Silver," "White/White/Metallic Silver" and "Midnight Navy/HyperBlue/White" as the base color combination.

Figure 13L:
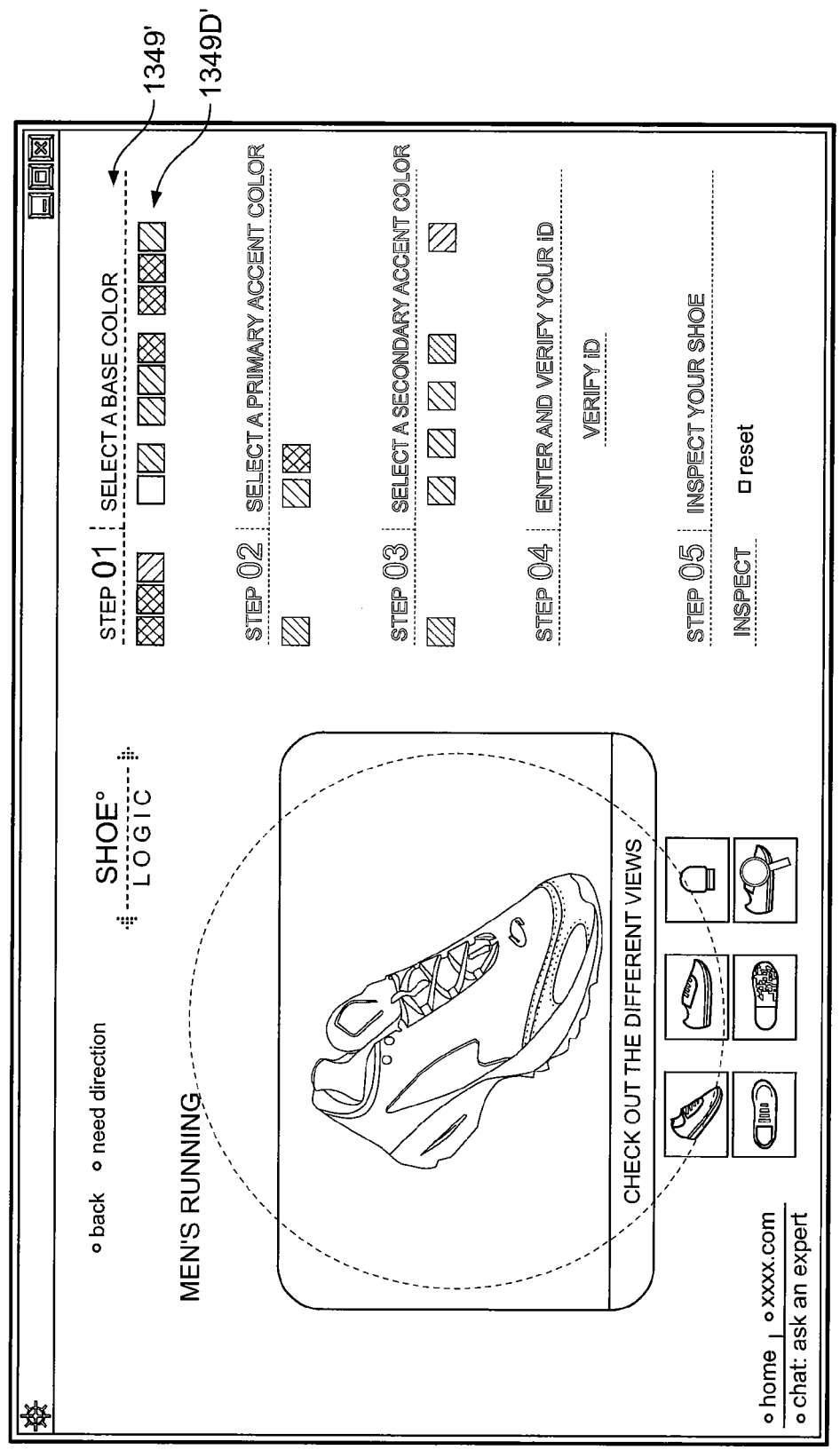

On the other hand, if the customer 109 selects the link represented by the image of the man in the image/link combination 279, the same component for designating a base color for a shoe receives this selection and generates the image/link combination 1349' shown in FIG. 13L. Unlike the image/link combination 1349, the image/link combination 1349' includes links for designating the base color combinations of the shoe to be any one of four combinations: "Black/Black/Metallic Silver," "White/White/Metallic Silver," "Neutral Grey/Neutral Grey/Storm Grey," and "Comet Red/Black/Metallic Silver." Thus, the same component (1305 or 1307) may generate different image/link combinations when provided with different input information.

Figure 13M:
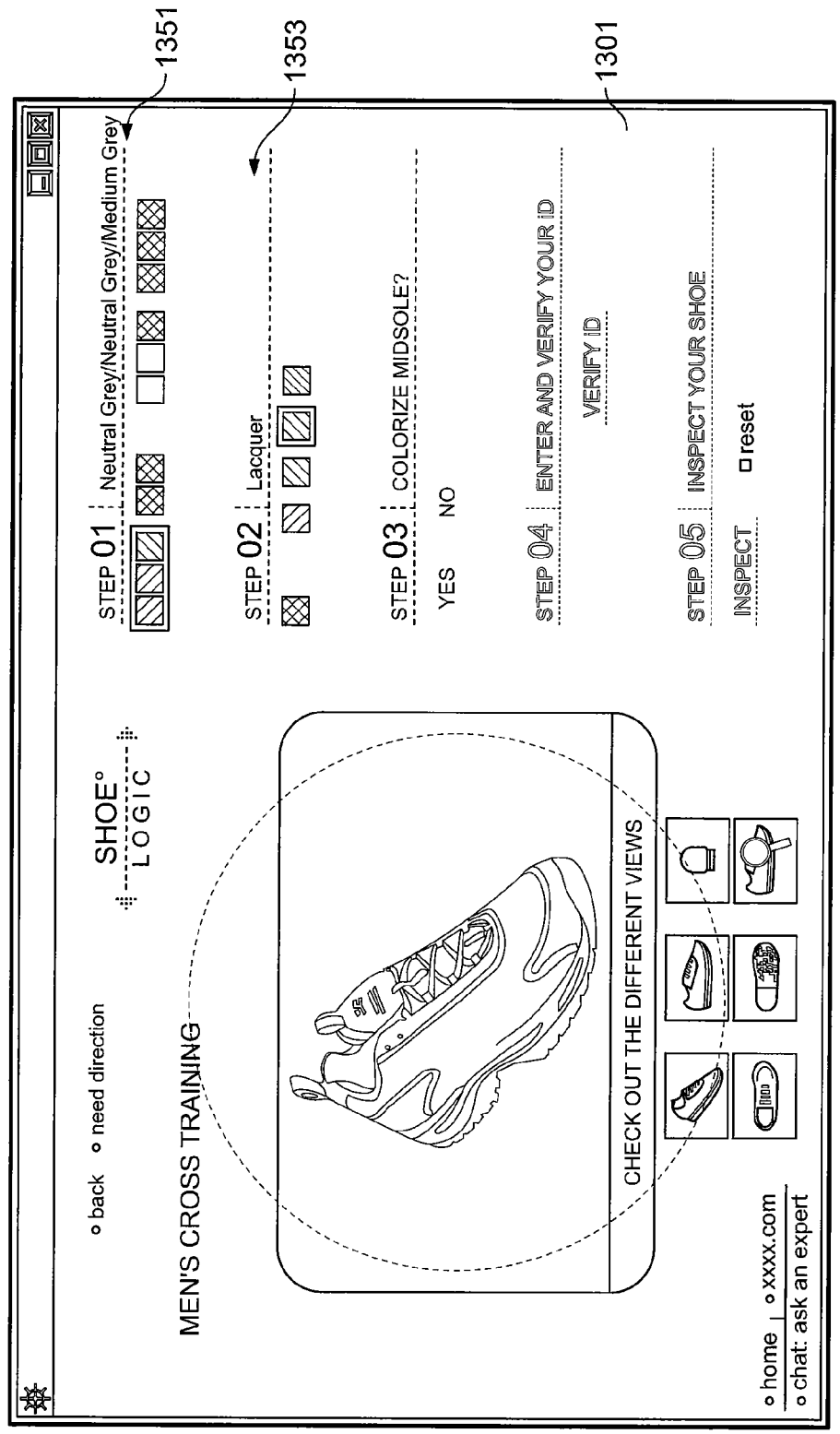
Figure 13N:
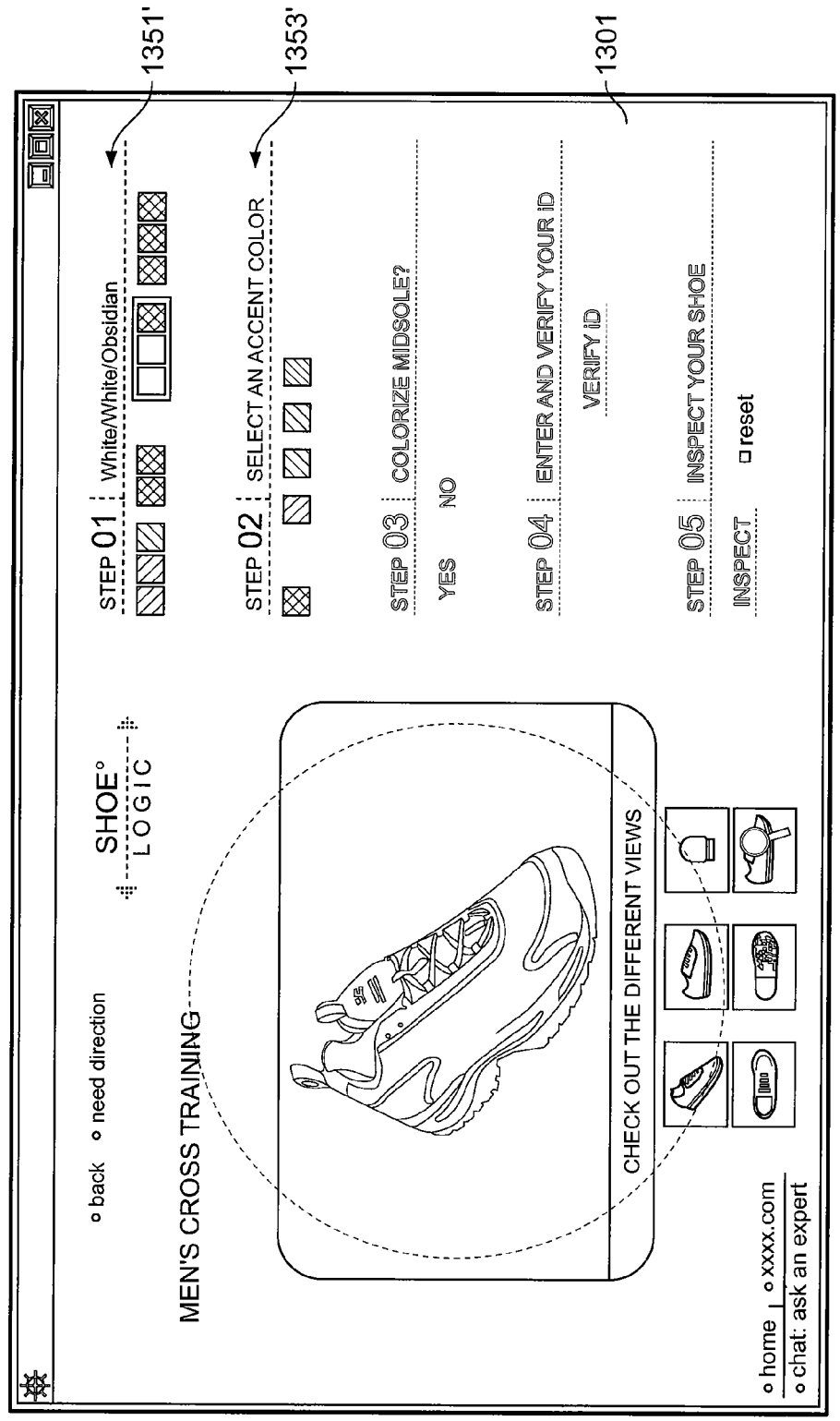

This feature is also shown in FIGS. 13M and 13N. If, for example, the customer 109 has selected a base color combination of "White/White/Obsidian," as shown by image/link combination 1351 of FIG. 13M, then the component 1307 for designating an accent color may generate a image/link combination 1353 that includes links for selecting among the colors "Black," "True White," "Metallic Silver," "Medium Grey," "Goldpost" and "Grey Stone." If, however, the customer 109 selected a base color combination of "Neutral Grey/Neutral Grey/Medium Grey," as shown by image/link combination 1351' of FIG. 13N, then the same component 1307 for designating an accent color may generate a image/link combination 1353' that includes links for selecting among the colors "Black," "True White," "Metallic Silver," "Storm Grey," "Lacquer" and "French Blue."

This feature of the components 1305, 1307 to influence the operation of subsequently employed components is useful. For example, it allows the retailer to retain some control over items that customers order for custom-manufacturing. Thus, the retailer can ensure that it does not inadvertently associate its brand with particularly ugly combinations of colors. Also, the retailer can employ this feature with the selection of structural components for an item, to ensure that a customer 109 does not accidentally order an item that may injure the customer 109 (e.g., a shoe that will be painful or dangerous to wear).

Returning now to the example illustrated in FIGS. 13B-13H, once the customer 109 has designated all of the customizable characteristics for the glove, the customer 109 can review the characteristics he or she has selected by activating the link entitled "Inspect" in the link section 1335C of image/link combination 1335. When this link is activated, the server 105 provides the customer's computer 111 with the inspection Web page 1401, shown in FIG. 14A.

As seen in this figure, the inspection Web page 1401 includes a content display area 1401, which displays the various characteristics for the glove selected by the customer 109. This allows the customer 109 to easily review the choices made by him or her for custom-ordering the item. The page 1401 also includes image/link combinations 1309-1319 and image 1321. As previously noted, the customer 109 can change the displayed blown-up view of image 1321 simply by selecting the command or link represented by one of the image/link combinations 1309-1319 showing that view. This allows the customer 109 to fully view the item as it would appear based upon the characteristics selected by the customer. The Web page 1401 further includes links 1405-1411, corresponding to the titles "Save To Profile," "Send To A Friend," "Print Summary," and "Add To Shopping Cart," respectively.

The information a retailer gathers through the invention for custom-manufactured items can be useful to the retailer in designing mass-produced items. For example, if an athletic apparel retailer receives a large number of orders for custom-manufactured clothing having the color orange, the retailer may want to manufacture more of its mass-produced clothing with the color orange as well. Similarly, if the retailer receives very few orders for custom-manufactured items with the color green, the retailer may want to reduce or even avoid the use of green in its mass-produced line of items.

While information gathered from orders for custom-manufactured items can be useful to the retailer, it is difficult to separate useful information from irrelevant information. If the retailer uses information gathered every time that a customer 109 selects a characteristic for an item, this information will be of little use. A customer 109 may try every available characteristic just to determine which one he or she likes best. On the other hand, if the retailer uses information gathered only from purchases of custom-manufactured equipment, there may be too few purchases of a particular item for the retailer to obtain statistically relevant information.

Accordingly, some preferred embodiments of the invention record a customer's characteristic choices for future use when the customer 109 obtains an inspection Web page 1401. By reaching this stage, the customer 109 has indicated enough of a preference for his or her characteristic choices to warrant its further consideration by the retailer. Inspection Web pages 1401 will not be obtained so frequently, however, that the retailer will be overloaded with the preference information contained in the pages 1401. Thus, when a customer 109 expends the significant amount of time necessary to obtain an inspection page 1401, the retailer records the information on that page into database 107 for future consideration.

Figure 14A:
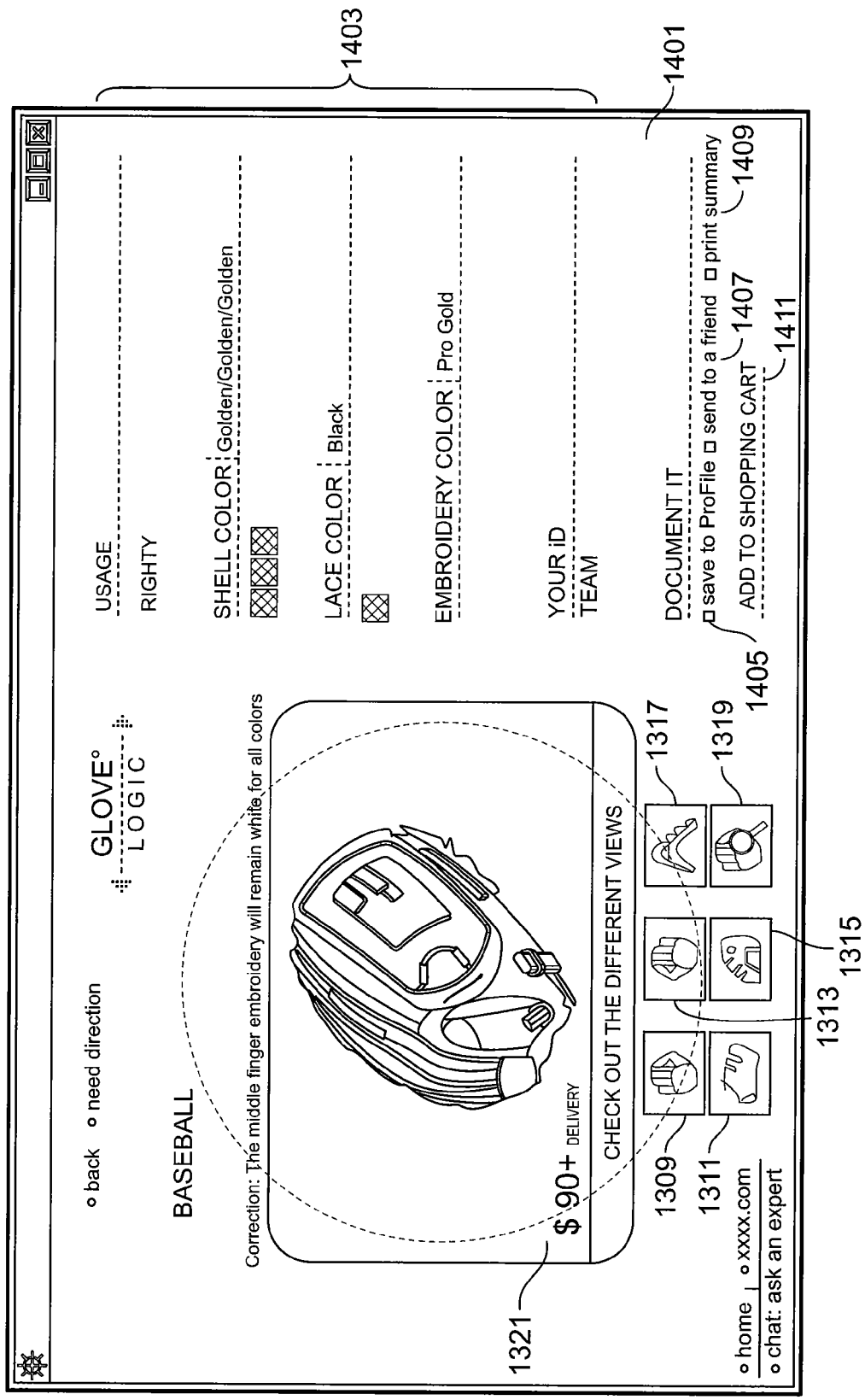

Returning now to the inspection web page 1401 shown in FIG. 14A, if the customer 109 has already established a user account with the server 105, the customer 109 can save the "build" he or she has created (i.e., the particular characteristics for a custom-manufactured item the customer 109 has selected) in that account by activating the link 1405. If the customer 109 has not already logged into his or her account, then the activation of this link 1405 retrieves the Web page 1501 shown in FIG. 15. This Web page 1501 includes fields 1503 and 1505 where the customer 109 can enter his or her user name and password, respectively. The Web page 1501 also includes the links 1507 and 1509 for submitting the user name and password in the fields 1503 and 1505 to the server 105, or canceling the process, respectively.

Figure 16:
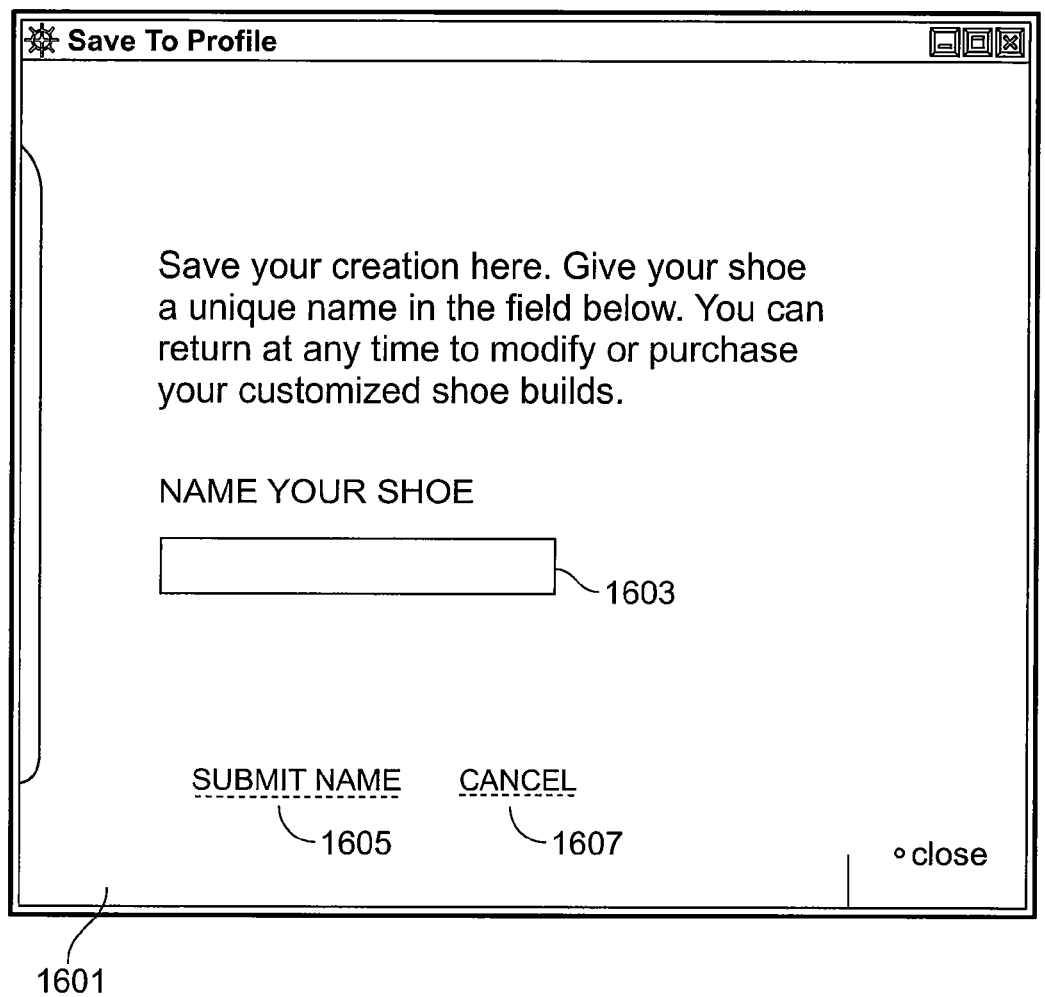
Figure 17:
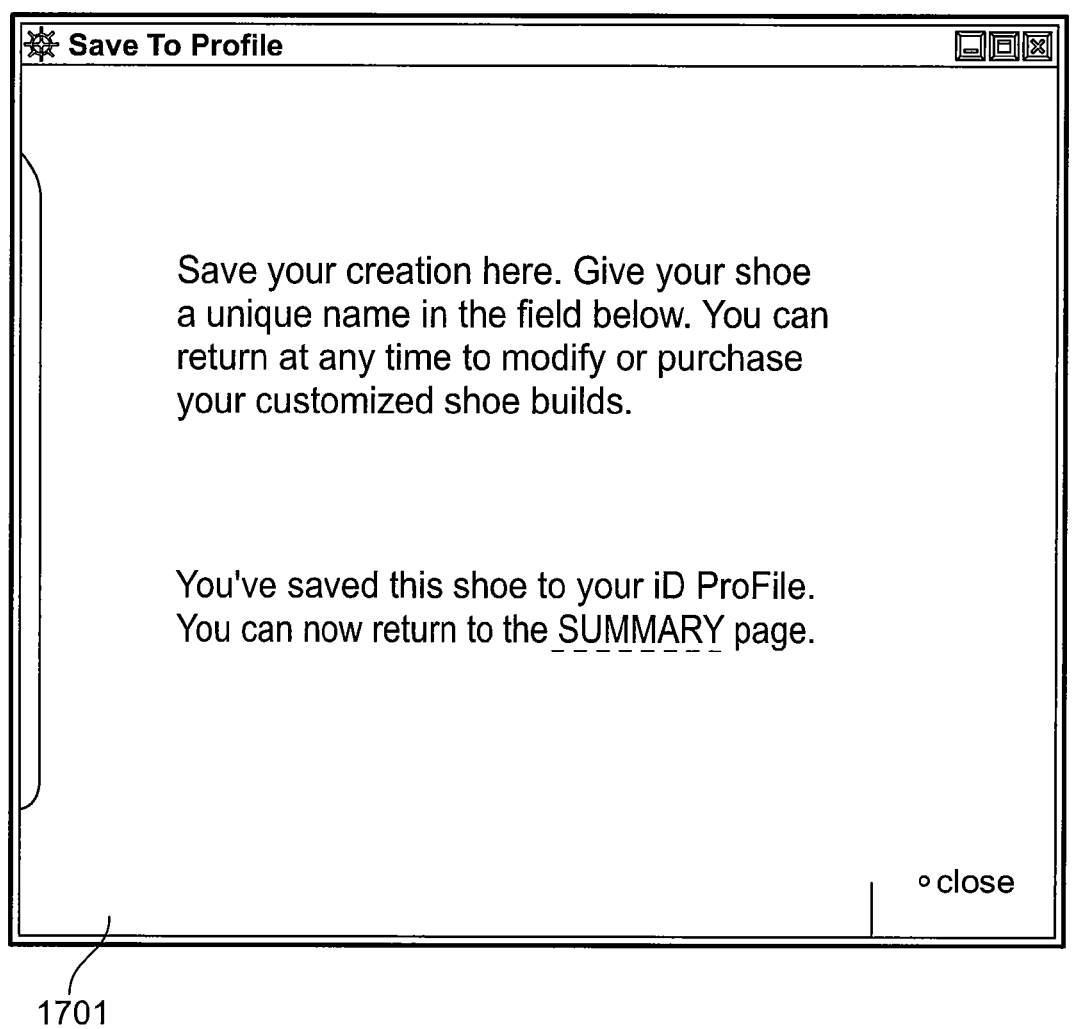

Once the customer 109 has logged into his or her user account with the server 105 (either before or after activating link 1405), the server 105 then provides the customer's computer device 111 with the Web page 1601 shown in FIG. 16. This Web page 1601 includes a field 1603 for entering the desired name of the "build" and link 1605 for submitting the name in the field 1603 to the server 105. The Web page 1601 also includes a link 1607 for canceling the procedure. After the customer 109 has submitted the name for the build to the server 105 using the Web page 1601, the server 105 provides the customer with the confirmation page 1701 shown in FIG. 17. As seen in this figure, the page 1701 confirms that the user account has saved the build with the designated name.

It will be appreciated that user accounts can be established for organizations, such as athletic teams, as well as individuals. Thus, a coach can create a build for a particular type of shoe (or other athletic equipment) that has the team's colors. Each member of the team can then employ the build stored in the team's user account to design and order a personal shoe according to his or her size. Each team member could also optionally customize the appearance of the shoe (or other athletic equipment) to include that member's team number. Still further, various embodiments of the invention might include user accounts that allow a single individual (e.g., a coach) to add builds to the user account or edit builds in the account, but would prevent other account users (e.g., team players) to from editing or deleting builds from the account.

Figure 18:
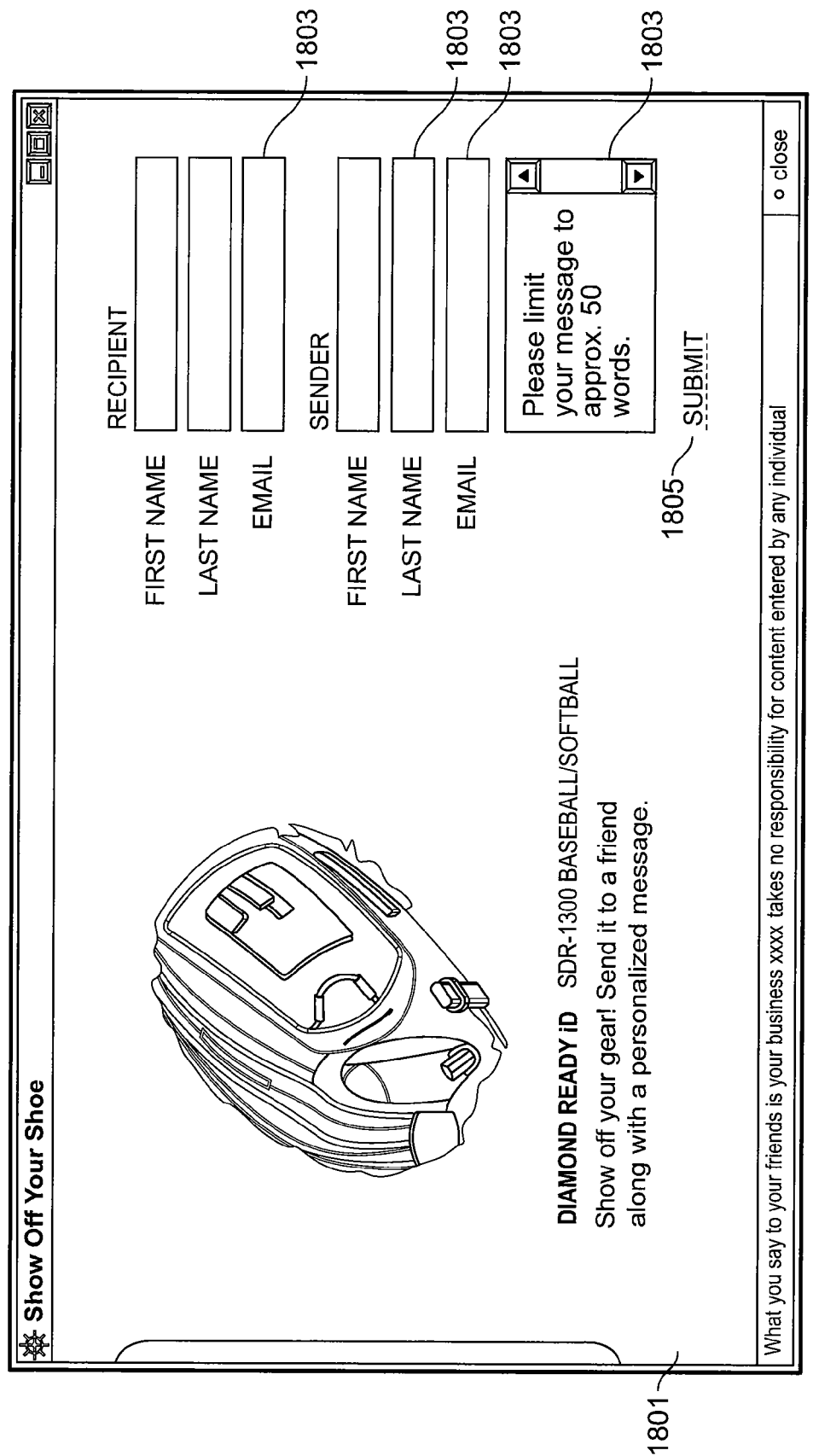
Figure 19:
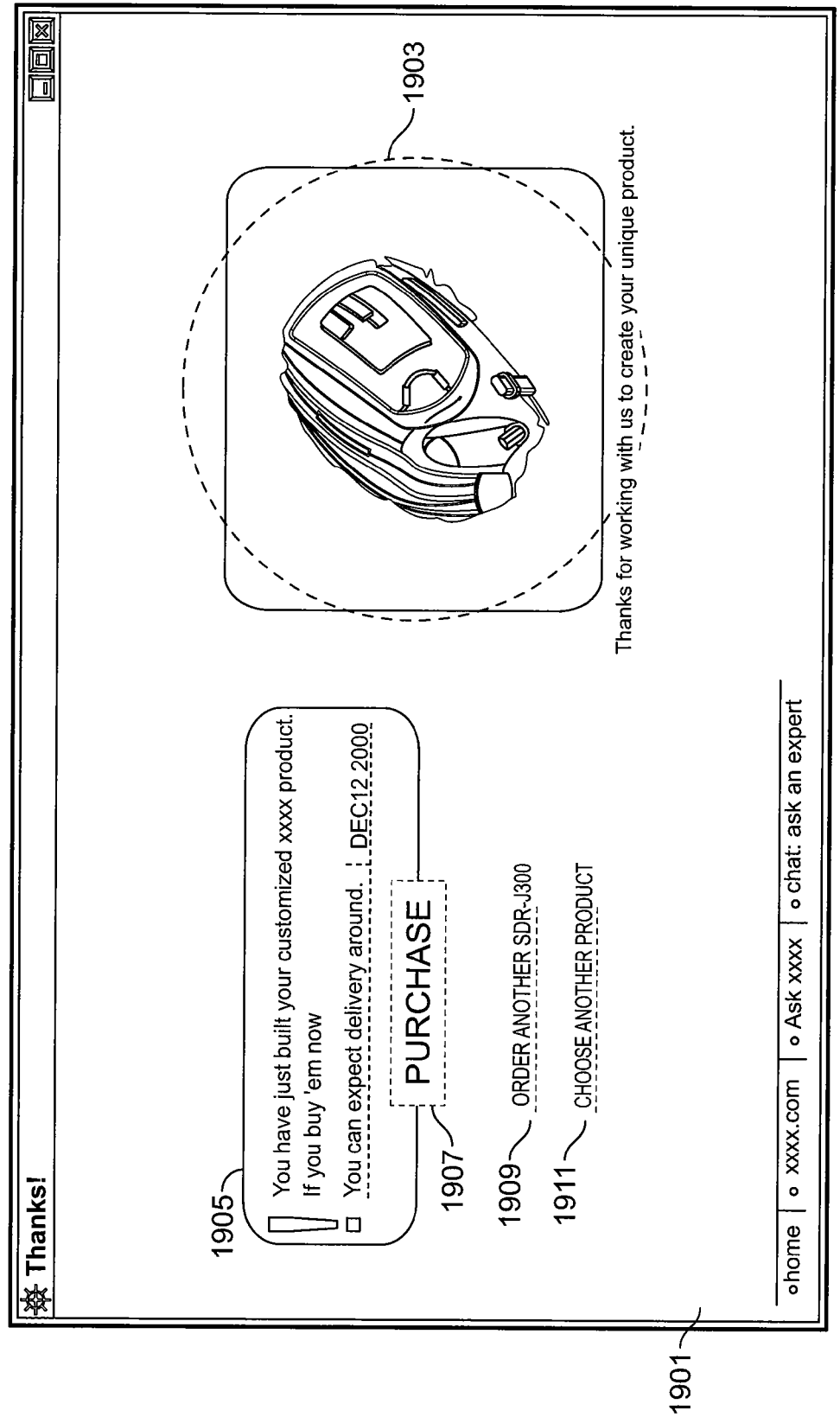

Turning back to FIG. 14A, if the customer 109 activates link 1407, the server 105 provides the customer's computer device 111 with the Web page 1801 shown in FIG. 18. This Web page 1801 includes fields 1803 that can be used by the customer 109 to electronically mail the build, along with a short message, to another person. After the customer 109 has prepared the build for mailing, the customer 109 can send the build by activating the link 1805 in this Web page. Alternately, if the customer 109 wants a printed summary of the build, he or she can activate link 1409. This will cause the customer's computer device 111 to print a summary of the build (not shown).

Lastly, if the customer 109 decides to purchase the glove, then the customer 109 activates link 1411 to add the build to the customer's shopping cart. In response, the server 105 provides the customer's computer device 111 with the Web page 1901, shown in FIG. 19. This page includes an image 1903 of the customized item, and a message 1905 indicating to the customer 109 when he or she can expect to receive the item if it is purchased. The page 1901 also includes a link 1907 to actually purchase the customized item, a link 1909 to order another item of that type (i.e., to initiate a new building process for that item), and a link 1911 to choose another product to custom-order.

Figure 14B:
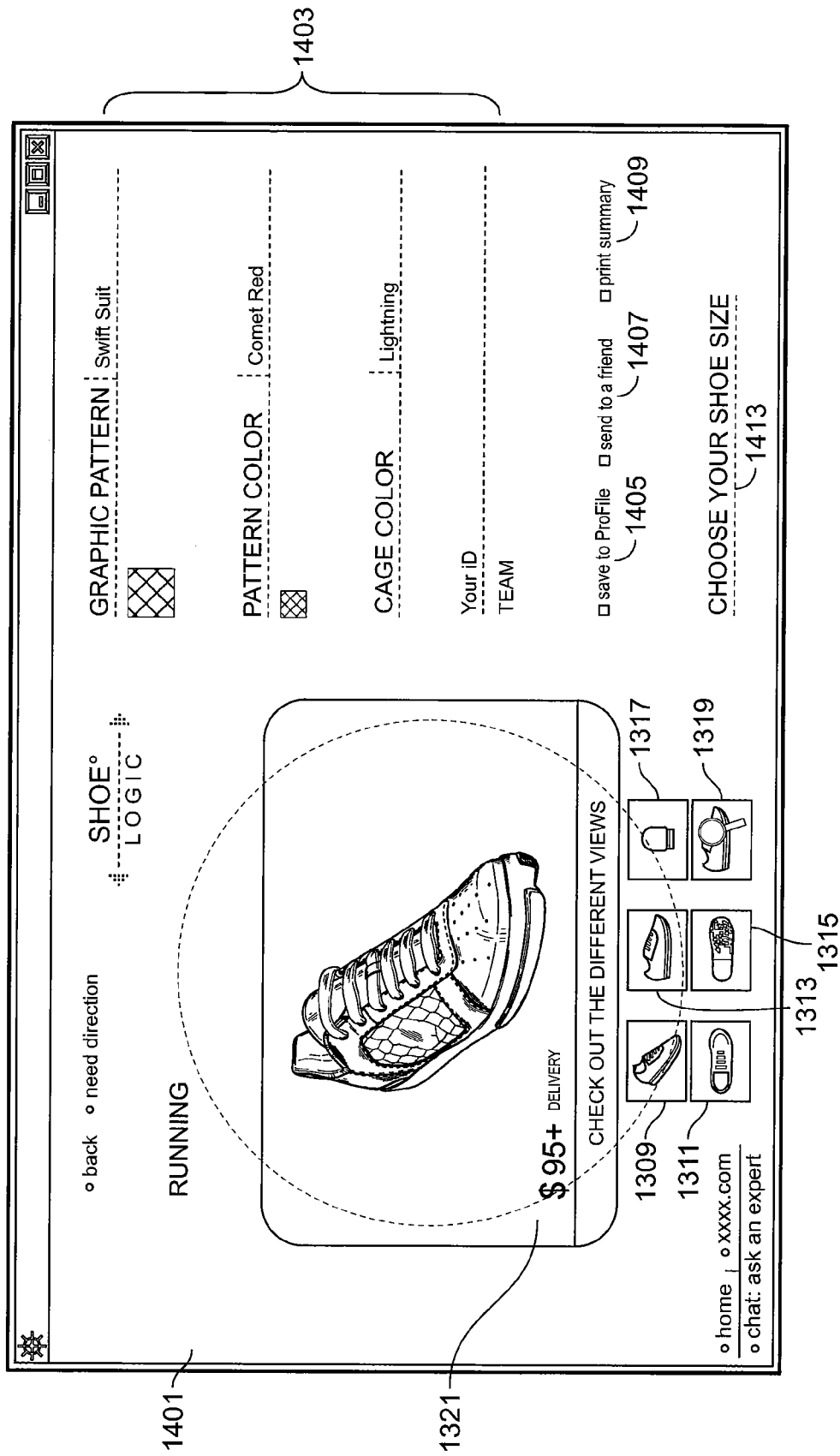
Figure 15:
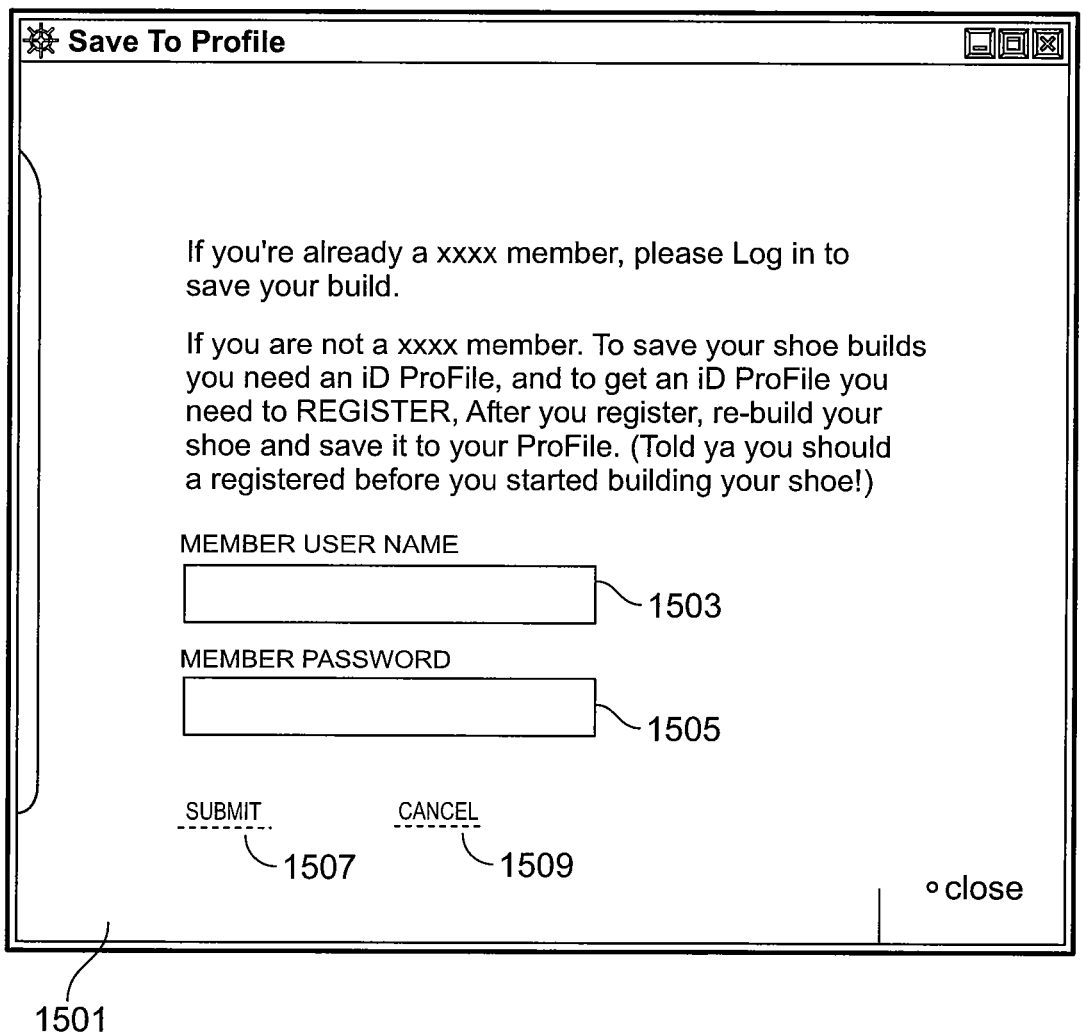

The example described with respect to FIGS. 13B-13H regarded a baseball glove, which does not require a particular size for use. If the customer 106 has built an item that requires a specific size (e.g., a pair of shoes), then the size must be specified before the item can be ordered. In this situation, the server 105 may provide the customer's computer with the inspection page 1401' shown in FIG. 14B rather than that shown in FIG. 14A in response to a request to inspect the build. The inspection page 1401' shown in FIG. 14B is similar to the inspection page 1401 shown in FIG. 14A, except that the inspection page 1401' contains link 1413 (entitled "Choose Your Shoe Size") rather than link 1411. To order the item, the customer 109 then activates link 1411.

Figure 20A:
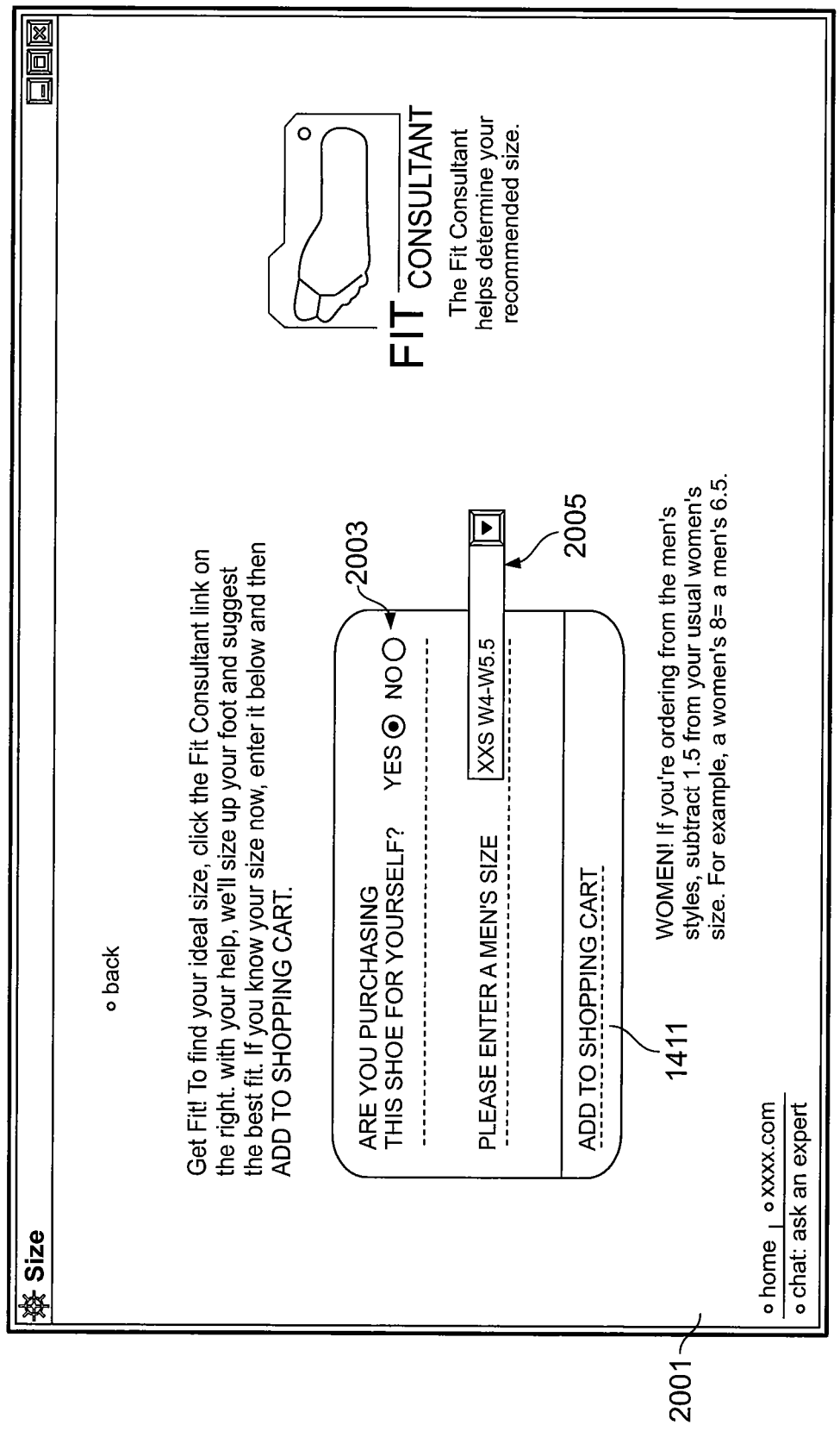

If the customer 109 has not established a user account with the server 105 (or has not logged into an existing user account), then activating the link 1411 retrieves the Web page 2001 shown in FIG. 20A. This Web page 2001 includes a field 2003 prompting the customer 109 to confirm that the item is being purchased for himself or herself and a field 2005 where the customer 109 can enter his or her size. Once the customer 109 has entered the appropriate size into the field 2005, the customer 109 can then activate link 1411 to retrieve the Web page 1901, as described above.

Figure 20B:
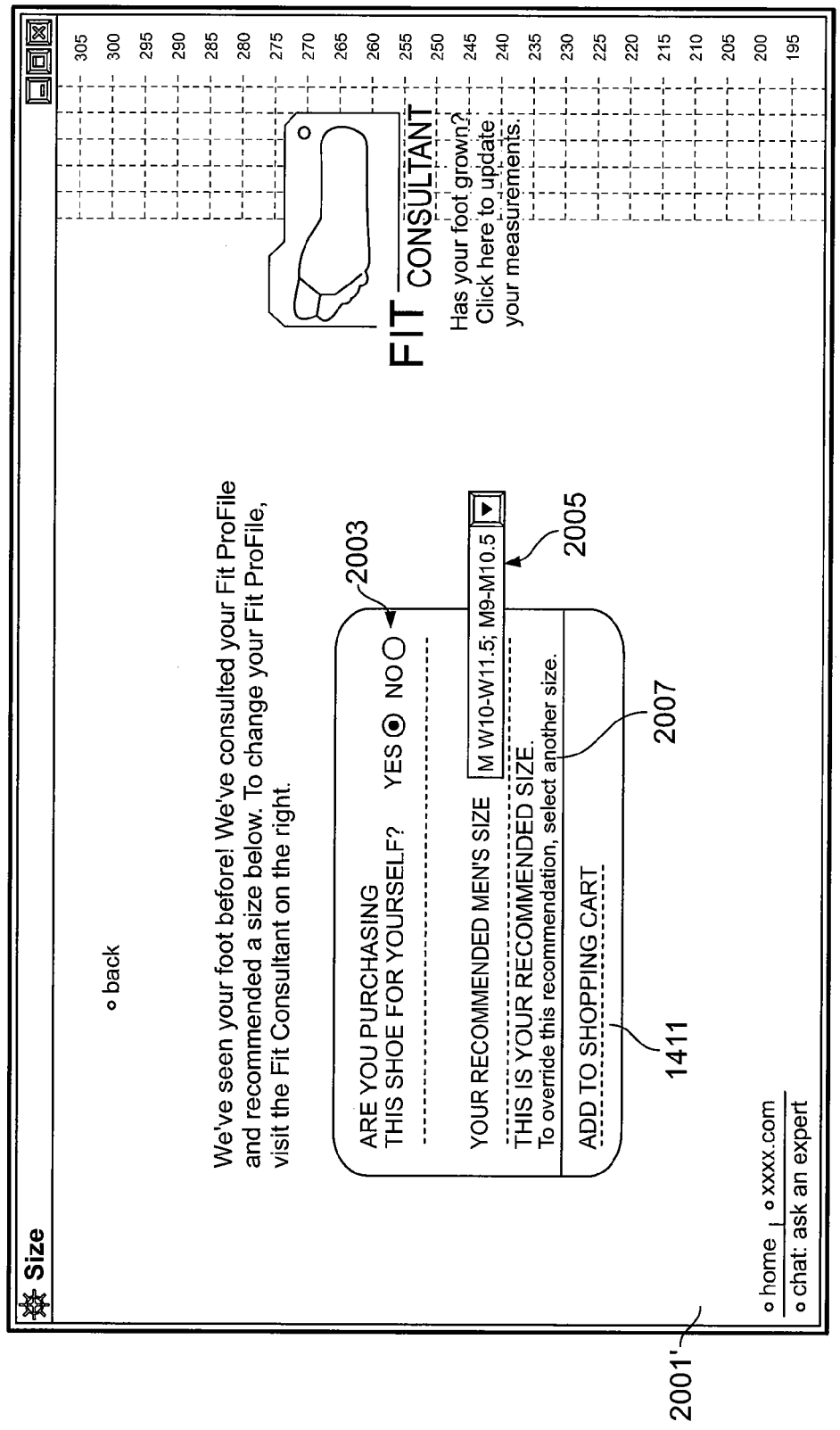

If, on the other hand, the customer 109 has already logged into an existing account with the server 105, then activating the link 1411 retrieves the Web page 2001' shown in FIG. 20B. This Web page 2001' also includes a field 2003 prompting the customer 109 to confirm that the item is being purchased for himself or herself. It should be noted that, if the customer 109 indicates that the build is not for himself or herself, then the build is not added to the customer's user account in the server 105. Thus, the server 105 will not have erroneous information if it attempts to make a determination (e.g., screen colors for the Web pages) based upon information in the user's account profile.

The Web page 2001' further includes a field 2003 where the customer 109 can enter his or her size. Unlike the Web page 2001, however, in the page 2001' the field 2003 will already show the size listed in the customer's user account. Also, the page 2001' will include a reminder 2007 that the size listed in the field 2003 is the customer's recommended size. Once the customer 109 has entered the appropriate size into the field 2005 (or confirmed that the size displayed in the field 2005 is correct), the customer 109 can then activate link 1411 to retrieve the Web page 1901, as described above.

It should be noted that both page 2001 and page 2001' contain the command button or link 213 entitled "Fit Consultant" (simply entitled "Fit" in FIG. 2A). Activating this command button initiates the operation of a size recommendation function employed by the invention. More particularly, this function recommends a size to a customer 109 based upon a variety of criteria. The system and method for performing this size recommendation function may utilize known methods.

While the application has been described with particular regard to shoe pairs and baseball gloves, those of ordinary skill in the art will appreciate that any items can be ordered for custom-manufacturing according to the invention. For example, the invention can be used to allow a customer 109 to custom-order a single shoe or even a part of a shoe. For example, a company may currently manufacture a shoe that has a reversible outer skin that fits over an internal booty. The invention can be used to allow a customer 109 to order just an outer skin for such a shoe, or a replacement booty if one becomes lost or damaged, or if the original booty was an incorrect size.

Still further, the invention might allow customers 109 to select different degrees of customization for an item. For example, the invention might allow a customer 109 to choose to customize an item completely (i.e., with no previously selected characteristics), but will also alternately allow the customer to have many of the characteristics of the item preselected. Thus, a customer 109 could select to add only personalized text to a shoe model whose color combination was preselected by a famous athlete or designer. Further yet, the invention can employ functions that allow customers 109 to vote on item models, color combinations, logos, and other characteristics that can be selected in the future to customize items. For example, due to limited server memory or manufacturing capability, a retailer may only be able to provide ten different color combinations for custom-manufacturing a particular shoe model. The invention could be employed to allow customers 109 to vote for the ten most popular color combinations out of hundreds of possible color combinations.

As shown in FIGS. 21-25, the system 101 of the present invention provides a design card or display card, generally designated with the reference numeral 10. The display card 10 has indicia 12 thereon. As discussed above, the consumer can utilize the system 101 to design an item or article such as footwear, or other athletic equipment, to be custom-manufactured. The custom-designed items will have colors, materials, markings etc. as designated by the consumer, and the item will be custom-manufactured according to the consumer's designations. As described below, the indicia 12 on the display card 10 corresponds to the item custom-designed by the consumer using the process as described above. In an exemplary embodiment, the display card 10 is printed generally simultaneously with the process for custom-designing the item to be custom-manufactured.

Figure 21:
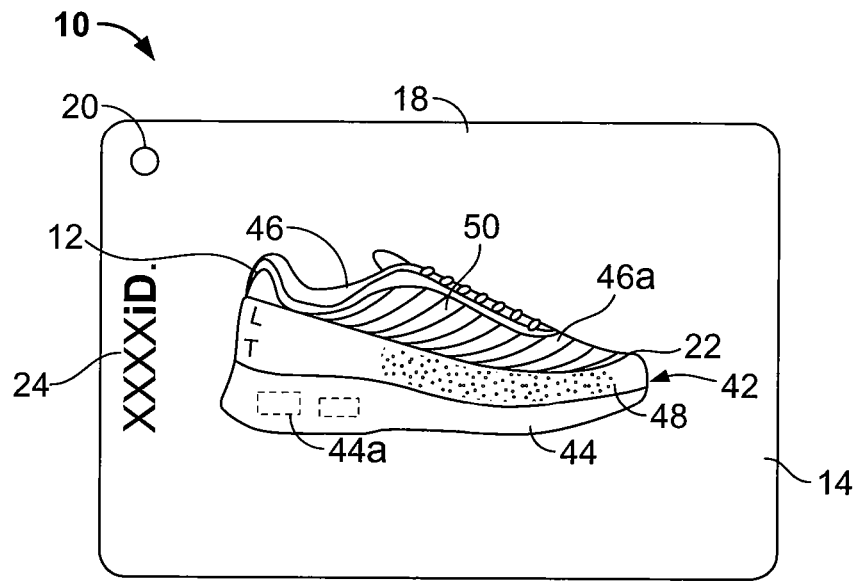
FIG. 21 shows a front side of a design card or display card according to an embodiment of the present invention.
Figure 22:
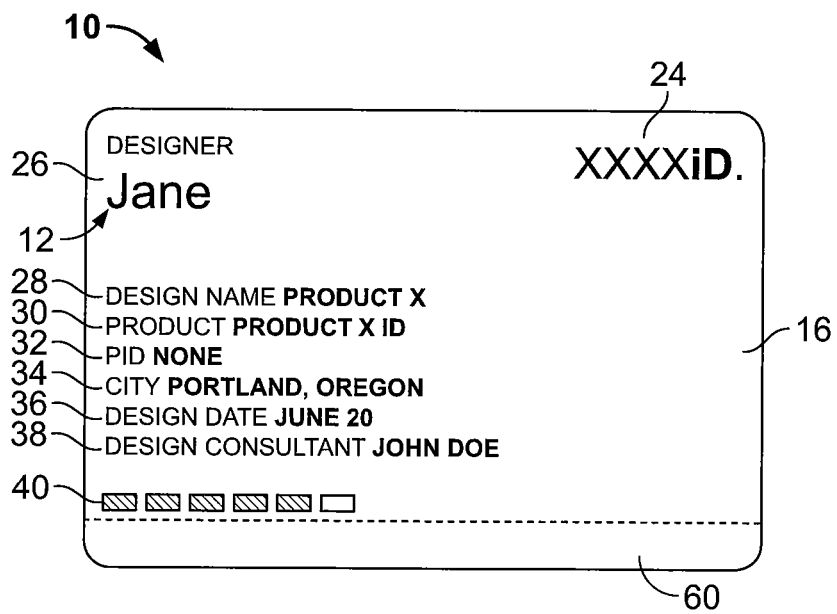
FIG. 22 shows a rear side of the display card shown in FIG. 21.
Figure 23:
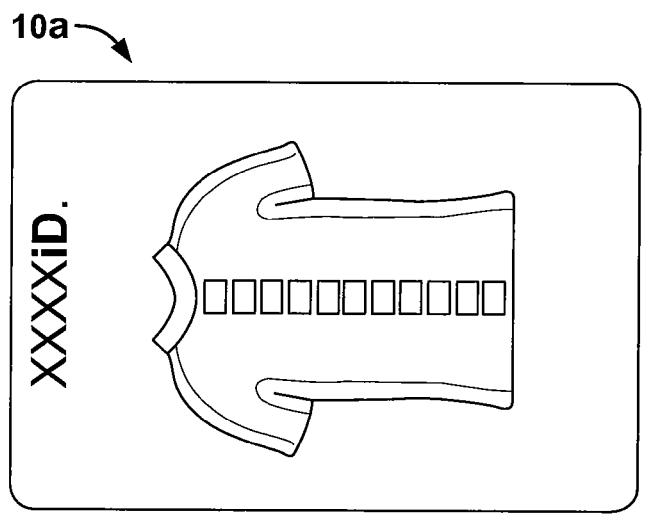
FIG. 23 shows an alternative embodiment of the display card of the present invention.

As shown in FIGS. 21 and 22, the display card 10 generally includes a first side 14, or front side 14, and a second side 16, or a rear side 16, wherein indicia 12 is provided on one or both of the sides 14, 16 of the card 10.

The display card 10 is generally a card member 18 made of plastic or other suitable material and sized similar to a conventional credit or debit card in one exemplary embodiment. The display card 10 may also be a piece of paper or other flexible material. The display card 10 may be include any suitable material that may have text or data physically or electronically imprinted or embedded on a surface of the display card 10. It is understood that the display card 10 can be sized smaller or larger as desired. The card member 18 may have an eyelet 20 if desired to be hung from a keychain or lanyard. The card member 18 may also have a protective coating as well.

The display card 10 may have a unique identifier that associates the display card 10 with a particular user or customer. In some examples, the unique identifier may be a name (such as a user or customer's name, a team name, a nickname, etc.), alphanumeric text, and an image (e.g., a picture of the customer). The unique identifier may also be in the form of electronic information such as a barcode, a radio frequency identification (RFID) tag, a security chip or tag, a magnetic stripe (e.g., the magnetic stripe used on a credit card or debit card), or any other suitable electronic information. The electronic information may be embedded within the display card 10 and/or the electronic information may be accessible by the display card 10. For example, the display card 10 may have a unique identifier that identifies a specific customer. The customer may utilize the display card 10 to access a database for viewing and creating a custom-designed item. The display card 10 may have the electronic information embedded on the surface of the display card or within the display card or may serve as a security verification to provide the user with access to additional design information.

FIG. 21 discloses the front side 14 of the display card 10. In one exemplary embodiment, the item to be designed for custom-manufacture is footwear. The indicia 12 on the display card, therefore, include an image 22, or picture of a shoe 22. The image of the shoe 22 includes a plurality of components as described in greater detail below. The indicia 12 may also include a name 24 or other identifier 24. It is understood that the size of the image 22 can vary as desired but generally occupies the majority of the central portion of the card member 18.

FIG. 22 discloses the rear side 16 of the display card 10. The indicia 12 are also included on the rear side 16 of the card 10 in the form of various types of data. The identifier 24 may be included on the rear side 16. In addition, a designer name 26 is included as well as a design name 28 of the item, a product identifier 30, a PID designation 32, city name 34, a design date 36 and a design consultant name 38. Color swatches 40 for a plurality of colors that the consumer selects for the design may also be included on the rear side 16 of the display card 10. In one exemplary embodiment, color swatches 40 of up to six colors are included.

In preparing the display card 10, a consumer first utilizes the system 101, or some portion of the system to custom design the item. As one example, the consumer may initially select footwear as the item to be designed for custom-manufacture. As discussed, the system 101 can be provided in numerous forms and locations. For example, the system 101, or portions thereof, may be provided at a retail location wherein a consumer can walk in to the retail location and begin the ordering process at a computer terminal. The computer terminal may be a self-service kiosk that is available to the consumer's at the retail location or at any other suitable location such as a sporting event. The computer terminal is any computer interface that is suitable to receive input from the user.

Consistent with the ordering process described above, the consumer first selects the type of item to designed, such as footwear. Characteristics of the shoe are then designated by the consumer. A first characteristic designated may be a particular type or model 42 of shoe. The model 42 designated may determine what other characteristics the consumer can designate for the design. Characteristics of a sole member 44 and an upper member 46 of the shoe are then designated by the consumer.

For the sole member 44, a characteristic regarding a structural type of sole member 44 is designated. Various types of sole members 44 can be available for selection such as solid rubber-type sole members or air-filled sole members (shown schematically) and others. In addition, a characteristic relating to color can be designated for the sole member 44.

The system may also prompt the consumer regarding the design of the upper member 46. The consumer may designate a characteristic relating to color for the upper member 46. It is further understood that the upper member 46 may have a plurality of components wherein separate components can be designated with different colors. For example, the upper member 46 may have a first portion 48 being designated a first color and a second portion 50 being designated a second color different from the first color. The upper member 46 may have additional portions, and it is understood that the sole member 44 could have other portions. Furthermore, the system 101 may provide for a consumer to designate characteristics of the portions of the upper member 46 to be made from different materials. Additional characteristics may also be provided such as different textures (shown schematically on the first portion 48 in FIG. 21) of the materials.

The system 101 can also provide additional characteristics to be designated by the consumer. For example, a characteristic relating to text T can be provided. This allows the consumer to place a unique name, number, or word that may be an identifier for the consumer. Another characteristic that can be provided is a choice of logo L or other graphical type of image, such as a player's uniform number or a consumer's favorite number. The text T and logo L can be positioned at various locations on the shoe. A number of different characteristics of the item have been enumerated herein. It is understood that other characteristics associated with the item such as the shoe can also be provided by the system for designation by the consumer.

Once the consumer completes the design for the shoe, the system 101 saves the data in a database, such as database 107 or some other storage location. The system 101 may also attach a code to the data such as a 6-8 digit unique, numeric code. The system 101 may also save data in the form of a cookie that denotes the location where the design is taking place. Furthermore, the system 101 can track the identity of design consultants 38 at the retail locations that may assist the consumers in designing the items. The design consultant 38 may also be prompted by the system 101 to login to the consumer's design session using a username and password. The system 101 may prompt the consumer to indicate whether the consumer wishes to proceed to have the designated design custom-manufactured into the product and shipped to the consumer. The system 101 further provides the enhanced feature of providing the display card 10 to the consumer. The system 101 prompts the consumer to indicate whether the consumer wishes to have the display card 10 printed. The system 101 can also be configured to automatically print the display card 10 when the consumer places the custom-order of the item just designed.

The system 101 prints the display card 10 based on the item just designed by the consumer using the printer 80. Thus, the system 101 will print the display card 10 having indicia 12 that corresponds to the characteristics designated by the consumer. In particular, the indicia 12 on the front side of the display card 10 will include the image 22 of the shoe just designed by the consumer. The image 22 of the shoe will correspond generally exactly to the characteristics designated by the consumer in the process just completed. Thus, the portion 44a of the image 22 depicting the sole member 44 will look like the sole member 44 designated, including structural components and color. The portion 46a of the image 22 depicting the upper member 46 will also look just like the upper member 46 designated by the consumer including materials, textures and colors. This corresponding configuration applies to all the components and portions of the upper member 46. The image 22 will also include any text T or logo L characteristics designated by the consumer during the order process. Any other visible characteristics designated by the consumer will be printed on the display card 10 by the system and be part of the image 22. Thus, the display card 10 will have the image 22 of the shoe 10 that corresponds to the characteristics designated by the consumer during the design of the shoe to be custom-manufactured. When the consumer receives the actual custom-manufactured shoe, the actual shoe will correspond to the image 22 on the display card 10. In addition, the display card 10 will also be printed with the indicia 12 corresponding to the consumer's pertinent information on the back side of the display card 10, e.g. designer 26, design name 28, product name 30 etc.

Accordingly, it is understood that the system 101 prints the display card 10 using current printing technology including controlled heat transfer wherein the display card 10 has the image 22 that corresponds to the item just designed by the consumer. The image 22 is printed in vivid color wherein full details of the item are shown including structural features, colors, materials and other markings. It is understood that while FIG. 21 shows a single image 22 of the item designed, multiple images can be provided such as showing different views of the item. For example, both side views, end views, and top and bottom views can be provided. It is further understood that other printing technologies can be utilized such as hologram images showing different views of the item. It is also understood that the display card 10 is printed generally simultaneously with the design process. Thus, while the custom-manufacture of the actual item may take a few days or weeks to be shipped to the consumer, the consumer can leave the retail location where the design was completed with an exact image of the design just completed on the custom printed display card 10. As discussed, the system 101 may be located in a retail location. The consumer may use a computer at the retail location wherein the card 10 is printed at the retail location by the printer 80 that is in communication with the local computer 111 at the retail location. It is understood that the entire system 101 may be completely within the retail location or the system may also communicate with other remote components such as over the Internet. Alternatively, the card 10 could also be printed remotely such as in an embodiment wherein the consumer designs an item for custom-manufacture from home or other location such as a mobile hand-held device. In this instance, the display card 10 can also be printed at a central location associated with the system and shipped to the consumer.

The display card 10 may be created or printed by any card-creating machine or computing device. The card-creating machine may be able to imprint images on a blank card and/or embed electronic information on a blank card. In one example, the display card may be a piece of paper on which images and text are imprinted and electronic information is stored. In another example, the card may be a small plastic card similar to a credit card on which images and text may also be imprinted. The small plastic card may also have a magnetic strip, an RFID tag, a microchip, or the like in which electronic information may be stored. A blank small plastic card may already contain the magnetic strip, the RFID tag, the microchip, or the like and the card-creating machine may encode the electronic information on the electronic media during the custom-design process.

Additional features may be incorporated into the display card 10 of the present invention. For example, the display card 10 may include a magnetic strip 60 such as shown schematically in FIG. 22. The magnetic strip 60 can store data related to the created design depicted by the indicia 12. The magnetic strip 60 can also include additional information and communication capabilities. The magnetic strip 60, or other memory and/or communication device, could be incorporated into the display card 10 such that the indicia 12 that forms the image 22 on the display card 10 can be transferred to other locations or to other consumers wishing to order a product corresponding to the image 22. Accordingly, the display cards 10 can be used by a plurality of consumers in creating a community of users revolving around custom-designed items for manufacture. The magnetic strip 60 can further have the same functionality as similar magnetic strips contained on credit/debit cards, gift cards, or key cards. As discussed, other types of storage or communication devices can be incorporated into the display card 10 such as RFID chips. Also, the display card 10 can also be configured for integration with surface computers wherein the computer provides interaction with digital content through natural hand gestures, touch and physical objects.

Figure 24:
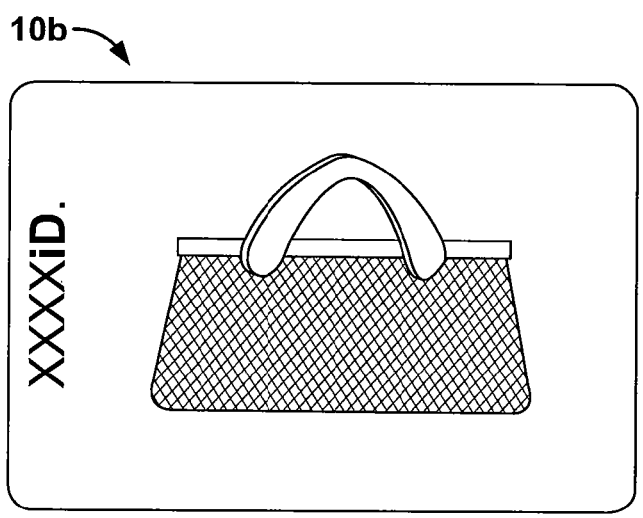
FIG. 24 shows an alternative embodiment of the display card of the present invention.
Figure 25:
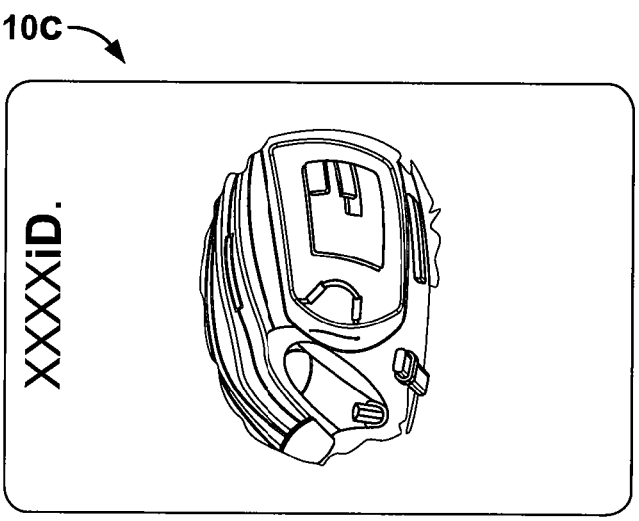
FIG. 25 shows another alternative embodiment of the display card of the present invention.

In one exemplary embodiment, the consumer may design footwear for custom-manufacture. Thus, the image 22 in FIG. 21 is of a shoe. It is understood that other items such as athletic equipment could also be designed for custom-manufacture wherein the display card 10 would be printed with indicia corresponding to these items. For example, FIG. 23 discloses a display card 10a having a shirt thereon. FIG. 24 discloses a display card 10b having a bag thereon. Other display cards 10c could include athletic equipment such as a baseball glove as shown in FIG. 25. It is further understood that the particular features of the system 101 for designing an item for custom-manufacture is one exemplary embodiment. The various steps of the process, different web pages can be varied as desired.

The display card 10 provides several benefits. It provides consumers with a tangible item depicting the consumer's custom design of the item in the image 22. The card can be used as a keepsake, memento, or souvenir. Thus, a consumer can accumulate several cards from different designs and keep the display cards 10 as collectibles. The consumer can also keep the display cards for future reference if it is desired to review previous design such as after the actual custom-designed merchandise has been worn out and discarded. This allows the consumer to easily order another custom-manufactured item according to an image on a previously printed card. The additional communication and data storage capabilities also allow a consumer to easily order additional custom-manufactured items according to the characteristics previously designated and displayed on the cards. Designs can be transferred to other interested persons or other consumers. Because the display card 10 is printed in color using current printing technology, the display card 10 has the image 22 that is more life-like and real. The card is also printed generally in real-time in relation to the ordering process. Thus, the consumer can obtain the card immediately upon custom-designing the item for custom manufacture.

As previously noted, the present invention has been described above by way of specific exemplary embodiments, and the many features and advantages of the present invention are apparent from the written description. Thus, it is intended that the appended claims cover all such features and advantages of the invention. Further, since numerous modifications and changes will readily occur to those skilled in the art, the specification is not intended to limit the invention to the exact construction and operation as illustrated and described. For example, the invention may include any one or more elements from the apparatus and methods described herein in any combination or subcombination. Accordingly, there are any number of alternative combinations for defining the invention, which incorporate one or more elements from the specification (including the drawings, claims, and summary of the invention) in any combinations or subcombinations. Hence, all suitable modifications and equivalents may be considered as falling within the scope of the appended claims.

What is claimed is:

1. A method comprising:
   causing presentation, by a device, of one or more design characteristics for an article of apparel to be custom-manufactured;
   processing user input selecting one or more design characteristics for the article of apparel;
   creating a card imprinted with indicia and having electronic information embedded within the card that corresponds to the selected one or more design, wherein the indicia include an image of the article of apparel that is pictorially represented on a surface of the card;
   communicating with the card to receive information relating to the indicia or the electronic information; and
   generating an instruction to instruct a manufacturer to manufacture the article of apparel based at least in part on the information relating to the indicia or the electronic information.

2. The method recited in claim 1, further comprising causing manufacturing of the article of apparel based at least in part on the information relating to the indicia.

3. The method recited in claim 1, wherein the article of apparel to be custom-manufactured is an article of footwear comprising an upper and a sole structure.

4. The method recited in claim 3, wherein a first design characteristic is a color of the upper and a second design characteristic is a color of the sole structure.

5. The method recited in claim 3, wherein a first design characteristic is a material of the upper and a second design characteristic is a type of the sole structure.

6. The method recited in claim 3, wherein at least one of the design characteristics is a material included in the upper.

7. The method recited in claim 3, wherein at least one of the design characteristics is a type of sole structure.

8. The method recited in claim 1, wherein the article of apparel is footwear.

9. The method recited in claim 1, wherein the article of apparel is a bag.

10. The method recited in claim 1, wherein the article of apparel is sporting equipment.

11. The method recited in claim 1, wherein at least one of the design characteristics is a color of a portion of the article of apparel.

12. The method recited in claim 1, wherein at least one of the design characteristics is an image capable of being imprinted on the article of apparel.

13. The method recited in claim 12, wherein the image is a team logo.

14. The method recited in claim 12, wherein the image is alphanumeric text.

15. The method recited in claim 1, wherein the indicia includes a designer's name.

16. The method recited in claim 1, wherein the indicia includes an alphanumeric description of the article of apparel to be custom-manufactured.

17. The method recited in claim 1, wherein the indicia includes information about a location at which the design was created.

18. The method recited in claim 1, wherein the indicia includes one or more color swatches.

19. A system for custom-manufacturing articles of apparel, comprising:
    a computer interface configured for receiving design input from a customer;
    a memory including a data store configured for storing information relating to at least the design input;
    a processor configured for evaluating the information relating to the design input and determining an article of apparel based at least in part on the design input; and
    a card creating machine configured for creating a card that has information corresponding to the design input electronically embedded within the card, wherein the design input is readable from the card by a reader device for ordering of the article of apparel, and wherein an image of the article of apparel having a design, corresponding to the design input received from the customer, is pictorially represented on a surface of the card.

20. The system recited in claim 19, wherein the computer interface is a self-service kiosk.

21. The system recited in claim 19, wherein the article of apparel is footwear including an upper and a sole structure.

22. The system recited in claim 21, wherein the design input includes an upper having a custom-selected color.

23. The system recited in claim 21, wherein the design input includes an upper including a custom-selected material.

24. The system recited in claim 21, wherein the design input includes a sole structure having a custom-selected color.

25. The system recited in claim 21, wherein the design input includes a sole structure including a custom-selected material.

26. The system recited in claim 19, wherein the design input includes a custom-selected image.

27. The system recited in claim 19, wherein the design input includes a logo.

28. The system recited in claim 21, wherein the design input specifies custom-selected text for the article of apparel.

29. The system recited in claim 19, wherein the card creating machine is also capable of electronically embedding a unique identifier on the card.

30. The system recited in claim 29, wherein the unique identifier is at least one of a customer's name, a location of the card creating machine, an image, a text, or one or more identifying alphanumeric characters.

31. The system recited in claim 20, wherein the self-service kiosk is located in a retail establishment.

32. The system recited in claim 19, wherein the design input identifies a material having a custom-selected texture.

* * * * *